US012112642B2

(12) United States Patent
Davidson et al.

(10) Patent No.: US 12,112,642 B2
(45) Date of Patent: Oct. 8, 2024

(54) SYSTEMS, METHODS, AND APPARATUS FOR COLLABORATIVE AIRCRAFT CHECKLISTS

(71) Applicant: INSITU, INC., Bingen, WA (US)

(72) Inventors: Darcy Davidson, Mount Hood Parkdale, OR (US); John M. Benton, Portland, OR (US); Kelly Watermeyer, Hood River, OR (US); Kendrick Trowbridge, Iowa City, IA (US); Pamela Macy, Mount Hood Parkdale, OR (US); Cameron Legleiter, Waukee, IA (US)

(73) Assignee: Insitu, Inc., Bingen, WA (US)

( * ) Notice: Subject to any disclaimer, the term of this patent is extended or adjusted under 35 U.S.C. 154(b) by 280 days.

(21) Appl. No.: 17/698,711

(22) Filed: Mar. 18, 2022

(65) Prior Publication Data

US 2022/0398929 A1 Dec. 15, 2022

Related U.S. Application Data

(60) Provisional application No. 63/209,355, filed on Jun. 10, 2021.

(51) Int. Cl.
*G08G 5/00* (2006.01)

(52) U.S. Cl.
CPC ......... *G08G 5/0021* (2013.01); *G08G 5/0013* (2013.01)

(58) Field of Classification Search
CPC .......................... G08G 5/0021; G08G 5/0013
See application file for complete search history.

(56) References Cited

U.S. PATENT DOCUMENTS

| | | | | |
|---|---|---|---|---|
| 2020/0019909 | A1* | 1/2020 | Grimon | G06Q 10/06316 |
| 2020/0298994 | A1* | 9/2020 | Conaway | G06F 16/9035 |
| 2020/0346783 | A1* | 11/2020 | Conaway | G06F 3/04817 |
| 2021/0192411 | A1* | 6/2021 | Conaway | G06F 3/0484 |
| 2022/0171917 | A1* | 6/2022 | Conaway | B64D 43/00 |

* cited by examiner

*Primary Examiner* — Peter D Nolan
*Assistant Examiner* — Mikko Okechukwu Obioha
(74) *Attorney, Agent, or Firm* — Hanley, Flight & Zimmerman, LLC

(57) ABSTRACT

Methods, apparatus, systems and articles of manufacture are disclosed for collaborative aircraft checklists. An example apparatus includes at least one memory including instructions and at least one processor to execute the instructions to at least launch actions of a checklist on a user interface of a first client device, the actions including a first action to be completed in sequence to execute a flight stage of a flight project, the flight project to be accessed by the first, second, and third client devices, in response to an update of the first action by the first client device, generate a first message including the update, in response to the second client device validating the update, distribute a second message including the update to the third client device to update the checklist on the third client device, and cause the aircraft to execute the flight stage based on the update.

20 Claims, 17 Drawing Sheets

SYSTEMS, METHODS, AND APPARATUS FOR COLLABORATIVE AIRCRAFT CHECKLISTS

This patent claims the benefit of U.S. Provisional Patent Application No. 63/209,355, which was filed on Jun. 10, 2021. U.S. Provisional Patent Application No. 63/209,355 is hereby incorporated herein by reference in its entirety. Priority to U.S. Provisional Patent Application No. 63/209,355 is hereby claimed.

FIELD OF THE DISCLOSURE

This disclosure relates generally to flight management and, more particularly, to systems, methods, and apparatus for collaborative aircraft checklists.

BACKGROUND

In recent years, management of flight operations of aircraft have become increasingly complex. Close coordination is needed between a plurality of different flight operation roles to achieve flight operation success. Some such flight operation roles include flight operators, ground crew, site leads, and mission commander. Some such flight operation roles may have flight operation actions or tasks to complete before subsequent flight operation actions or tasks can be initiated by different flight operation roles.

SUMMARY

Example systems, methods, and apparatus for collaborative aircraft checklists are disclosed. An example apparatus includes at least one memory including instructions, and at least one processor to execute the instructions to at least launch actions of a checklist on a user interface of a first client device, the actions including a first action to be completed in sequence to execute a flight stage of a flight project, the flight project associated with flight of an aircraft, the flight project to be accessed by client devices via a network, the client devices including the first client device, a second client device, and a third client device, in response to an update of the first action by the first client device, generate a first message including the update, in response to a validation of the update by the second client device, distribute a second message including the update to the third client device to update the checklist on the third client device, and cause the aircraft to execute the flight stage based on the update.

At least one example non-transitory computer readable medium includes instructions that, when executed, cause at least one processor to at least launch actions of a checklist on a user interface of a first client device, the actions including a first action to be completed in sequence to execute a flight stage of a flight project, the flight project associated with flight of an aircraft, the flight project to be accessed by client devices via a network, the client devices including the first client device, a second client device, and a third client device, in response to an update of the first action by the first client device, generate a first message including the update, in response to a validation of the update by the second client device, distribute a second message including the update to the third client device to update the checklist on the third client device, and cause the aircraft to execute the flight stage based on the update.

An example method includes launching actions of a checklist on a user interface of a first client device, the actions including a first action to be completed in sequence to execute a flight stage of a flight project, the flight project associated with flight of an aircraft, the flight project to be accessed by client devices via a network, the client devices including the first client device, a second client device, and a third client device, in response to an update of the first action by the first client device, generating a first message including the update, in response to the second client device validating the update, distributing a second message including the update to the third client device to update the checklist on the third client device, and causing the aircraft to execute the flight stage based on the update.

DETAILED DESCRIPTION

Figure 1:
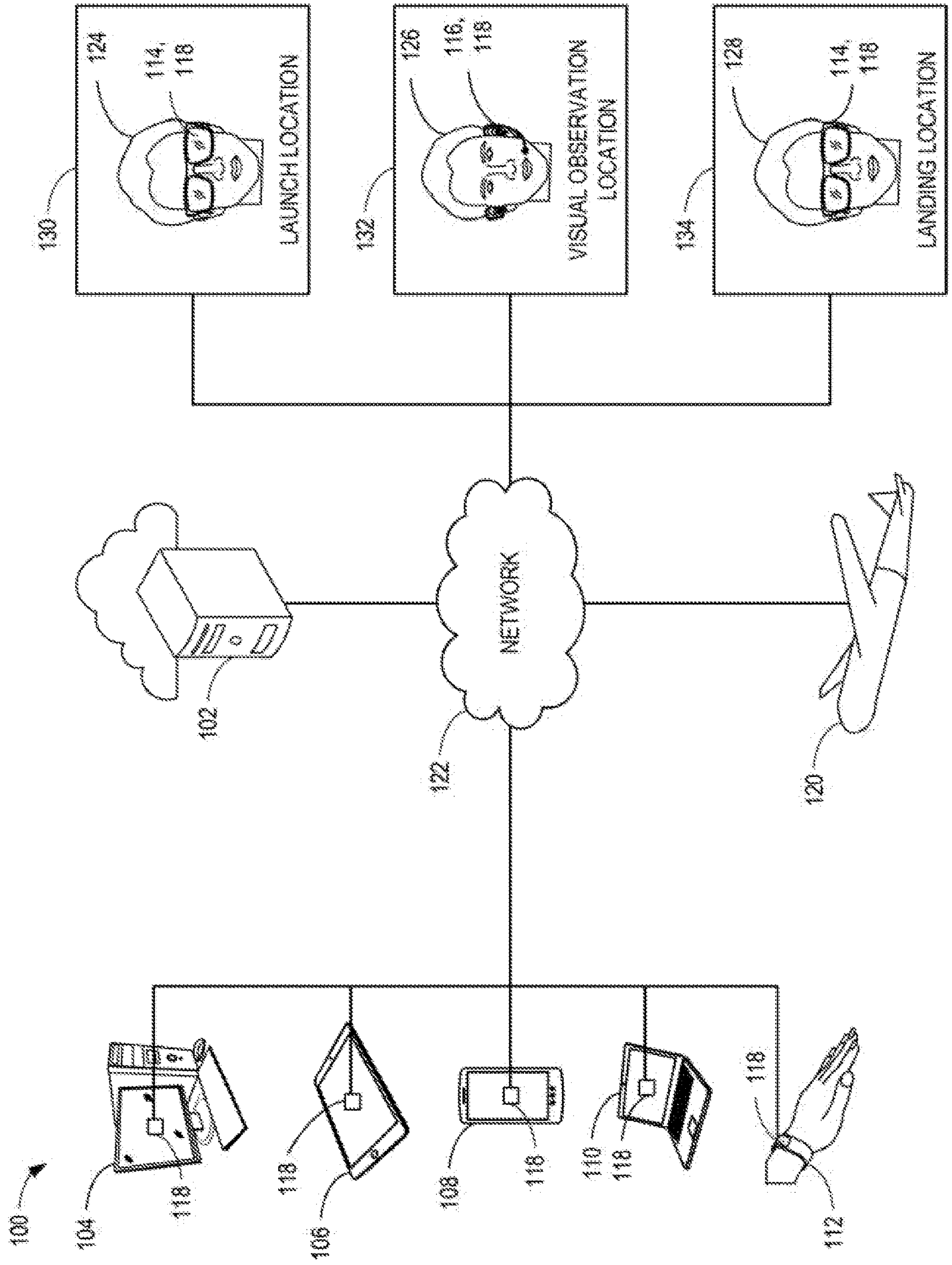
FIG. 1 is an illustration of an example flight management system in which an example central server and example client devices implement example collaborative aircraft checklists to facilitate flight of an example aircraft.

The figures are not to scale. In general, the same reference numbers will be used throughout the drawing(s) and accompanying written description to refer to the same or like parts.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components. As used herein "substantially real time" refers to occurrence in a near instantaneous manner recognizing there may be real world delays for computing time, transmission, etc. Thus, unless otherwise specified, "substantially real time" refers to real time+/−1 second.

Management of flight operations or procedures associated with aircraft, such as commercial aircraft, utility aircraft, unmanned aerial vehicles (UAVs) (e.g., drones), has become increasingly complex. For example, a flight operation (e.g., flying from a first location to a second location) of an aircraft may be implemented in multiple flight stages. The flight stages may include a pre-flight stage, an in-flight stage, and a post-flight stage. Examples of tasks to complete in the pre-flight stage may include selecting an aircraft, configuring the aircraft, preparing the aircraft for take-off or launch, etc. Examples of tasks to complete in the in-flight stage may include taking-off, landing, flying from a first waypoint to a second waypoint, etc. Examples of tasks to complete in the post-flight stage may include parking the aircraft, stopping propeller blades, turning off the aircraft, etc.

Multiple personnel in various roles may perform actions or tasks in multiple locations to implement the different flight stages. Some such actions or tasks may be executed remotely, such as the taking-off or launching of a UAV. Some such actions or tasks may need to be completed in sequence to ensure the safety of the multiple personnel. For example, aircraft ground crew may need to complete a first task of moving to a specified distance away from a UAV before a control operator (e.g., a UAV control operator) may safely complete a second task of enabling a propeller of the UAV.

Some prior systems to facilitate flight management of aircraft may include the completion of written checklists (e.g., before-takeoff written checklists). For example, an aircraft control operator and an aircraft ground crew operator may each have their own copy of the same written checklist and coordinate with each other to complete the written checklist step-by-step. In some such examples, a step of the checklist may be completed when verbal confirmation of the step completion is given by one party and is received by another party via radio or other wireless communication. Some such prior systems may become increasingly complex to implement safely when a plurality of locations associated with the flight operation of the aircraft is needed. For example, an aircraft control operator may be unable to coordinate flight operations efficiently and safely between take-off ground crew, flight observation crew, and landing ground crew, each of which may be operating in different locations than the aircraft control operator. In some such examples, the different aircraft personnel may individually update their own written checklists, which may cause the written checklists maintained by the different aircraft personnel to quickly become unsynchronized.

Examples disclosed herein include collaborative aircraft checklists to execute flight operations of an aircraft efficiently and safely. Examples disclosed herein enable different aircraft personnel (e.g., control operators, ground crew operators, visual observation operators, etc.) to coordinate in substantially real time the completion and/or execution of various checklist actions to complete the flight operations. In some disclosed examples, the checklist actions may be device-based, location-based, and/or role-based. Advantageously, checklist notifications indicating edits, updates, and/or completions of checklist actions may be propagated to the appropriate device, location, and/or role. In some disclosed examples, one(s) of the checklist actions may be disabled until different one(s) of the checklist actions are completed to improve safety related to aircraft personnel executing the corresponding checklist actions. Advantageously, certain checklist actions may be disabled or enabled at various points in the process to ensure safety of the aircraft personnel.

In some disclosed examples, the collaborative aircraft checklists are implemented using a distributed computing system that connects different types of aircraft personnel, such as operators, ground crew, site leads, mission commanders, etc., together through a set of collaborative applications. In some disclosed examples, the collaborative aircraft checklists may be implemented using software applications that may be executed by different types of client devices (e.g., client computing devices, client handheld devices, client portable devices, etc.), such as smartphones, tables, laptops, workstations, etc. In some disclosed examples, the collaborative aircraft checklists may enable the aircraft personnel to share a common view of the fight operation. In some disclosed examples, the collaborative aircraft checklists scale actions or tasks across geography and device type.

Advantageously, the collaborative aircraft checklists disclosed herein reduce aircraft personnel workload to focus their attention on executing the flight operation efficiently and safely. Advantageously, the collaborative aircraft checklists disclosed herein enable remote split operations (e.g., executing a first task remotely and validating the first task locally, executing the first task remotely and executing a second task locally, etc.). Advantageously, the collaborative aircraft checklists disclosed herein implement connected, collaborative mission and role based applications to ensure mission reliability, safety, and success.

FIG. 1 is an illustration of an example flight management system 100 in which an example central server 102 and example client devices 104, 106, 108, 110, 112, 114, 116 implement an example client application 118, which, when executed, may implement example collaborative aircraft checklists as described herein to facilitate flight of an example aircraft 120. Further depicted in the flight management system 100 is an example network 122, a first example aircraft personnel 124, a second example aircraft personnel 126, and a third example aircraft personnel 128.

The client application 118, and/or, more generally, the flight management system 100, may be used to control and/or monitor flight operations associated with the aircraft

120. In this example, the aircraft 120 is an unmanned aerial vehicle (UAV) (e.g., a drone, an autonomous UAV, etc.). Alternatively, the aircraft 120 may be implemented as a manned aircraft. In this example, the aircraft 120 is a fixed-wing aircraft. Alternatively, the aircraft 120 may be implemented as another type of aircraft (e.g., a rotorcraft).

In the illustrated example of FIG. 1, the client application 118 executes one or more routines (e.g., software routines) or programs (e.g., software programs) that may be implemented by the execution of machine readable instructions. For example, the client application 118 may implement a client routine and the central server 102 may implement a server routine. In some examples, the client application 118 may be a flight management related software application operating on a standard operating system (e.g., a Windows™-based operating system, an Apple macOS® operating system, an Apple iOS® operating system, an Android™ operating system, a Linux® operating system, etc.).

In the illustrated example of FIG. 1, the client application 118 may be executed by one(s) of the client devices 104, 106, 108, 110, 112, 114, 116. Alternatively, the client application 118 may be executed by fewer or more than the quantity and/or type of the client devices 104, 106, 108, 110, 112, 114, 116 depicted in FIG. 1. Although the client application 118 is depicted as being the same on each of the client devices 104, 106, 108, 110, 112, 114, 116 alternatively, the client application 118 may be tailored and/or otherwise customized based on the type of the client device 104, 106, 108, 110, 112, 114, 116. For example, the client application 118 executing on the first client device 104 may be different than the client application 118 executing on the second client device 106. In some such examples, the client application 118 may have a different user interface, different communication drivers (e.g., the second client device 106 may have Bluetooth 5.0 while the third client device 110 has Bluetooth 4.0, etc.), to comport with the corresponding hardware platform. In some examples, the client application 118 has no interface other than a voice user interface (VUI). For example, the VUI of the client application 118 executed by the seventh client device 116 may be used to completely replace a keyboard or other type of input from the second aircraft personnel 126.

The client application 118 may be executed by one(s) of the client devices 104, 106, 108, 110, 112, 114, 116 to enable a user, such as one of the aircraft personnel 124, 126, 128, to view, execute, and/or validate a checklist action of an aircraft collaborative checklist. In some examples, the client application 118 may be executed by one(s) of the client devices 104, 106, 108, 110, 112, 114, 116 to enable a user, such as one of the aircraft personnel 124, 126, 128, to obtain data or information associated with the aircraft 120. For example, the client application 118 may launch a checklist associated with a flight stage of the aircraft 120. In some such examples, the client application 118 may load checklist actions of the checklist that, when executed and/or otherwise completed, may implement the flight stage of the aircraft 120.

In the illustrated example of FIG. 1, the first client device 104 is a workstation (e.g., a desktop computer or tower and a display device) that, when executing the client application 118, may view, execute, and/or validate a checklist action associated with the aircraft 120. In some examples, the workstation, when executing the client application 118, may monitor and/or control the aircraft 120 and/or communicate with one(s) of the client devices 106, 108, 110, 112, 114, 116 in connection with a checklist action and/or, more generally, the aircraft 120.

In this example, the second client device 106 is a tablet (e.g., an Internet-enabled tablet computer, an iPad™, a Surface, etc.) that, when executing the client application 118, may view, execute, and/or validate a checklist action associated with the aircraft 120. In some examples, the tablet, when executing the client application 118, may monitor and/or control the aircraft 120 and/or communicate with one(s) of the client devices 104, 108, 110, 112, 114, 116 in connection with a checklist action and/or, more generally, the aircraft 120.

In this example, the third client device 108 is a cellular phone (e.g., a smartphone, an Internet-enabled cellular phone, etc.) that, when executing the client application 118, may view, execute, and/or validate a checklist action associated with the aircraft 120. In some examples, the cellular phone, when executing the client application 118, may monitor and/or control the aircraft 120 and/or communicate with one(s) of the client devices 104, 106, 110, 112, 114, 116 in connection with a checklist action and/or, more generally, the aircraft 120.

In this example, the fourth client device 110 is a laptop computer (e.g., a portable computer or computing device, etc.) that, when executing the client application 118, may view, execute, and/or validate a checklist action associated with the aircraft 120. In some examples, the laptop computer, when executing the client application 118, may monitor and/or control the aircraft 120 and/or communicate with one(s) of the client devices 104, 106, 108, 112, 114, 116 in connection with a checklist action and/or, more generally, the aircraft 120.

In this example, the fifth client device 112 is a first wearable device that, when executing the client application 118, may view, execute, and/or validate a checklist action associated with the aircraft 120. In this example, the first wearable device is a smartwatch, a smart wristband with a display device, etc., that includes a processor-based hardware platform including one or more processors, one or more memory devices and/or one or more mass storage devices to store machine-readable instructions, and/or one or more interface circuits to facilitate wireless communication (e.g., Bluetooth communication, cellular network communication, Wi-Fi communication, etc.). In some examples, the first wearable device, when executing the client application 118, may monitor the aircraft 120 and/or communicate with one(s) of the client devices 104, 106, 108, 110, 114, 116 in connection with a checklist action and/or, more generally, the aircraft 120.

In this example, the sixth client device 114 is a second wearable device that, when executing the client application 118, may view, execute, and/or validate a checklist action associated with the aircraft 120. In this example, the second wearable device is a head-mounted display (e.g., an augmented reality head-mounted display, a heads-up display, etc.) or glasses (e.g., smart glasses, augmented reality glasses, etc.) that may include one or more lenses (e.g., display devices that may display data, information, etc.). For example, the head-mounted display or glasses may include a processor-based hardware platform including one or more processors, one or more memory devices and/or one or more mass storage devices to store machine-readable instructions, and/or one or more interface circuits to facilitate wireless communication (e.g., Bluetooth communication, cellular network communication, Wi-Fi communication, etc.). In some examples, the second wearable device, when executing the client application 118, may monitor the aircraft 120 and/or communicate with one(s) of the client devices 104, 106, 108, 110, 112, 116 in connection with a checklist action and/or, more generally, the aircraft 120.

In this example, the seventh client device 116 is a third wearable device that, when executing the client application 118, may listen to, execute, and/or validate a checklist action associated with the aircraft 120. In this example, the third wearable device is a headset that may include a microphone, a speaker, etc. For example, the headset may include a processor-based hardware platform including one or more processors, one or more memory devices and/or one or more mass storage devices to store machine-readable instructions, and/or one or more interface circuits to facilitate wireless communication (e.g., Bluetooth communication, cellular network communication, Wi-Fi communication, etc.). In some examples, the third wearable device, when executing the client application 118, may monitor the aircraft 120 and/or communicate with one(s) of the client devices 104, 106, 108, 110, 112, 114 in connection with a checklist action and/or, more generally, the aircraft 120.

In this example, at least one of the first client device 104, the second client device 106, the third client device 108, the fourth client device 110, the fifth client device 112, the sixth client device 114, or the seventh client device 116 is a portable device. For example, at least one of the first client device 104, the second client device 106, the third client device 108, the fourth client device 110, the fifth client device 112, the sixth client device 114, or the seventh client device 116 may be a handheld device (e.g., a handheld computing device), a wearable device, or a device that is capable of being easily transportable between locations.

The network 122 of the illustrated example of FIG. 1 is the Internet. However, the network 122 may be implemented using any suitable wired and/or wireless network(s) including, for example, one or more Local Area Networks (LANs), one or more wireless LANs, one or more cellular networks, one or more private networks, one or more public networks, one or more terrestrial networks, one or more non-terrestrial networks (e.g., a satellite network), etc. The network 122 enables one(s) of the client devices 104, 106, 108, 110, 112, 114, 116, to be in communication with the central server 102 and/or one(s) of each other.

In the illustrated example of FIG. 1, the central server 102 may be implemented by one or more computer servers, one or more data facilities, one or more cloud services, etc., capable of storing data (e.g., checklist data, aircraft data, etc.) and transmitting the data to one(s) of the client devices 104, 106, 108, 110, 112, 114, 116 via the network 122. In some examples, the central server 102 may host the client application 118. For example, one(s) of the client devices 104, 106, 108, 110, 112, 114, 116 may access a uniform resource locator (URL) corresponding to the client application 118 hosted by the central server 102. In some such examples, the central server 102 may identify a type of the requesting client device based on the accessed URL and provide a corresponding user interface (UI) that may be optimized and/or otherwise tailored for the type of the requesting device. In some examples, the central server 102 obtains data associated with the aircraft 120 from the aircraft 120. For example, the central server 102 may obtain a location (e.g., a Global Positioning System (GPS) location), an airspeed, an altitude, etc., from the aircraft 120 and may store the location, the airspeed, the altitude, etc., in a database. In some such examples, the central server 102 may provide the stored data to requesting one(s) of the client devices 104, 106, 108, 110, 112, 114, 116 via the client application 118.

In the illustrated example of FIG. 1, the aircraft personnel 124, 126, 128 are effectuating a flight operation of the aircraft 120. The aircraft personnel 124, 126, 128 are in example locations 130, 132, 134 including a first example location 130, a second example location 132, and a third example location 134. In this example, the first location 130 is a launch location of the aircraft 120. For example, the first aircraft personnel 124 may utilize the sixth client device 114 (or a different one of the client devices 104, 106, 108, 110, 112, 114, 116) to access a first checklist corresponding to a pre-flight stage. In some such examples, the first aircraft personnel 124 may launch one or more first checklist actions of the first checklist on the sixth client device 114, which may include selecting the aircraft 120, taxiing the aircraft 120 onto a runway, etc.

In this example, the second location 132 is a visual observation location. For example, the second aircraft personnel 126 may be located along a flight path of the aircraft 120 to confirm that the sky along the flight path is clear from other aircraft, the aircraft 120 is flying to specified waypoints along the flight path, etc. In some examples, the second aircraft personnel 126 may utilize the seventh client device 116 (or a different one of the client devices 104, 106, 108, 110, 112, 114, 116) to access a second checklist corresponding to an in-flight stage. In some such examples, the second aircraft personnel 126 may launch one or more second checklist actions of the second checklist on the seventh client device 116, which may include confirming that the sky along the flight path of the aircraft 120 is free from other aircraft, that the aircraft 120 successfully navigated to a pre-identified waypoint, etc.

In this example, the third location 134 is a landing location of the aircraft 120. For example, the third aircraft personnel 128 may utilize the sixth client device 114 (or a different one of the client devices 104, 106, 108, 110, 112, 114, 116) to access a third checklist corresponding to a post-flight stage. In some such examples, the third aircraft personnel 128 may launch one or more third checklist actions of the third checklist on the sixth client device 114, which may include taxiing the aircraft 120 off a runway, parking the aircraft 120 in an aircraft hangar, powering off the aircraft 120, etc.

Advantageously, the client application 118 may be accessed by one(s) of the client devices 104, 106, 108, 110, 112, 114, 116 to cause the execution of one or more flight stages of the aircraft 120, such as a pre-flight stage, an in-flight stage, a post-flight stage, etc. In example operation, a control operator may execute the client application 118 on the first client device 104. The control operator may collaborate with the aircraft personnel 124, 126, 128 in substantially real-time to update, edit, and/or complete checklist actions of a checklist corresponding to a flight stage of the aircraft 120.

In example operation, the control operator may execute a first checklist action of the checklist, which may include remotely powering on the aircraft 120 while the aircraft 120 is parked in an aircraft hangar. The control operator may update, using the client application 118 on the first client device 104, the first checklist action of the checklist to indicate that the first checklist action has been completed by the control operator. The first aircraft personnel 124 may receive a notification via the client application 118 on the sixth client device 114 that the first checklist action has been updated. The first aircraft personnel 124 may validate the first checklist action (e.g., confirm that the first checklist action has been completed) via the client application 118 on the sixth client device 114. For example, the first aircraft personnel 124 may confirm that the aircraft 120 has been remotely powered on and may validate the first checklist action by updating the first checklist action on the client application 118 to indicate that the first checklist action has been validated. In some examples, the control operator may access video captured by the sixth client device 114 to verify that the aircraft 120 has been remotely powered on to provide an additional layer of verification or validation.

In example operation, in response to validating the first checklist action, the first aircraft personnel 124 may execute a second checklist action, which may include moving to a safe distance away from the aircraft 120 to ensure that the aircraft 120 may begin to move without compromising the safety of the first aircraft personnel 124. In this example, the second checklist action is in sequence with a completion of the first checklist action (e.g., the second checklist action to be completed after the first checklist action). In some examples, the second checklist action may not be completed until after the first checklist action has been validated. For example, the client application 118 may disable the second checklist action until the first checklist action has been validated. The control operator may validate the second checklist action by updating the second checklist action on the client application 118 on the first client device 104 to indicate that the second checklist action has been validated. For example, the control operator may access the video captured by the sixth client device 114 to ensure that the first aircraft personnel 124 maintains a safe distance away from the aircraft 120.

Advantageously, such an example execution and validation schema based on a checklist as implemented by the client application 118 improves the safety and efficiency at which flight operations of the aircraft 120 may be conducted. Advantageously, the execution, notification, and validation of checklist actions implemented by the client application 118 as described herein reduces and/or otherwise eliminates the potential for unsynchronized aircraft checklists to cause undesired results.

Figure 2:
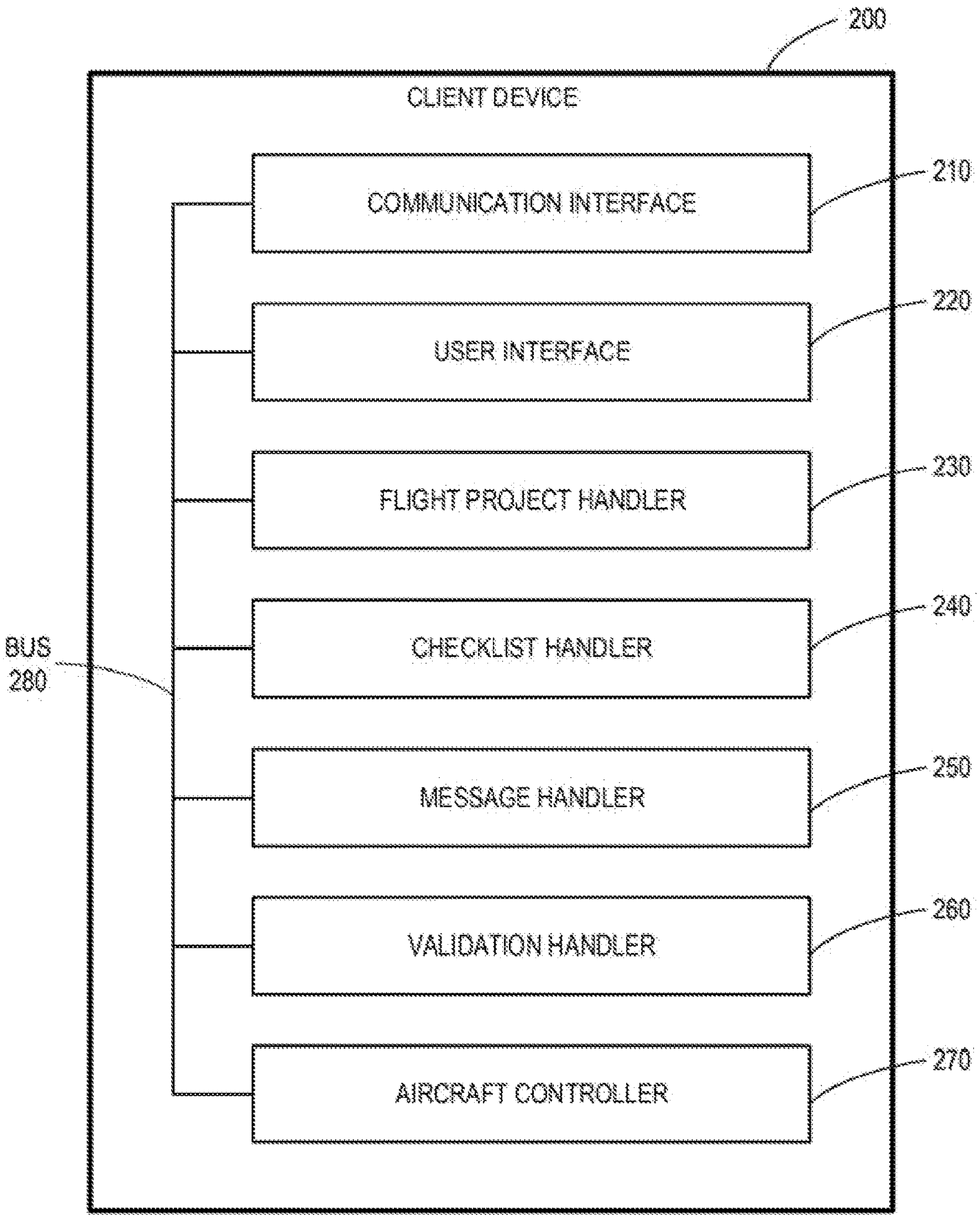
FIG. 2 is a block diagram of an example implementation of one(s) of the client devices of FIG. 1.

FIG. 2 is a block diagram of an example implementation of a client device 200. The client device 200 may effectuate a flight stage of the aircraft 120. For example, the client device 200 may launch a checklist including a checklist action. In some such examples, the client device 200 may allow a user, such as one(s) of the aircraft personnel 124, 126, 128 of FIG. 1, to view, execute, and/or validate the checklist action. In some examples, the client device 200 may implement one(s) of the client devices 104, 106, 108, 110, 112, 114, 116 of FIG. 1.

The client device 200 of the illustrated example of FIG. 2 includes an example communication interface 210, an example user interface 220, an example flight project handler 230, an example checklist handler 240, an example message handler 250, an example validation handler 260, an example aircraft controller 270, and an example bus 280. In this example, the communication interface 210, the user interface 220, the flight project handler 230, the checklist handler 240, the message handler 250, the validation handler 260, and the aircraft controller 270 are in communication with one(s) of each other via the bus 280. For example, the bus 280 may implement at least one of an Inter-Integrated Circuit (I2C) bus, a Serial Peripheral Interface (SPI) bus, or a Peripheral Component Interconnect (PCI) bus. Additionally or alternatively, the bus 280 may implement any other type of computing or electrical bus.

In the illustrated example of FIG. 2, the client device 200 includes the communication interface 210 to obtain information from and/or transmit information to the network 122 of FIG. 1. In some examples, the communication interface 210 transmits checklist modifications (e.g., an update, an edit, a completion, etc., of a checklist action) to the central server 102 of FIG. 1. In some examples, the communication interface 210 receives and/or otherwise obtains checklist notifications (e.g., a notification indicating that a checklist action has been modified) from the central server 102.

In some examples, the communication interface 210 implements a web server that receives the information from the network 122 and/or transmits the information to the network 122. In some examples, the communication interface 210 formats the information as HTTP message(s). However, the communication interface 210 may utilize any other message format and/or protocol such as, for example, a file transfer protocol (FTP), a simple message transfer protocol (SMTP), an HTTP secure (HTTPS) protocol, etc. In some examples, the communication interface 210 implements a client/server communication session between the client device 200 and the central server 102. For example, the central server 102 may push data to the client device 200 on an asynchronous or synchronous basis.

In the illustrated example of FIG. 2, the client device 200 includes the user interface 220 to launch actions of a checklist. For example, the user interface 220 may implement a user interface, such as a graphical user interface (GUI), a voice user interface (VUI), etc., of the client devices 104, 106, 108, 110, 112, 114, 116. In some such examples, the user interface 220 may launch a user interface by opening a browser (e.g., a web browser, an Internet browser, etc.) to access a website hosted by the central server 102 of FIG. 1. For example, the user interface 220 may open the browser to access the client application 118 of FIG. 1. In some examples, the user interface 220 may launch a VUI to allow a user to interact with the client application 118 through speech or voice commands. For example, the user interface 220 may launch the VUI to audibly communicate checklist actions or aircraft data via one or more speakers. In some such examples, the user interface 220 may launch the VUI to obtain spoken commands by the user and deploy speech recognition to understand the spoken commands.

In some examples, the user interface 220 launches a user interface based on a type of the client device 200. For example, the user interface 220 may determine that the first client device 104 of FIG. 1 is a desktop computer. In some such examples, the user interface 220 may launch a user interface that is tailored to and/or otherwise corresponds to execution by the desktop computer. Advantageously, the user interface 220 may launch one of a plurality of user interfaces based on a type of the client device 200.

In some examples, the user interface 220 launches and/or otherwise loads a checklist in a user interface based on a flight project role and/or checklist actions. For example, the user interface 220 may determine that the client device 200 is associated with a flight project role of control operator (e.g., aircraft control operator, flight control operator, etc.), ground crew (e.g., launch site or location ground crew, landing site or location ground crew, etc.), visual observer, etc. In some such examples, the user interface 220 may determine that the client device 200 is associated with a control operator based on the client device 200 being the first client device 104 of FIG. 1.

In some examples, the user interface 220 launches and/or otherwise loads a checklist in a user interface based on one or more checklist actions. For example, the user interface 220 may determine that the flight project role is associated with one or more checklist actions of a pre-flight stage, an in-flight stage, a post-flight stage, etc. In some such examples, the user interface 220 may launch a user interface and load a checklist on the user interface with the checklist including the one or more checklist actions based on at least one of the flight project role or the one or more checklist actions.

In the illustrated example of FIG. 2, the client device 200 includes the flight project handler 230 to generate a flight project associated with an aircraft based on an identifier of the aircraft. For example, the flight project handler 230 may generate a flight project (e.g., a flight operation project) based on an identifier, such as a tail number, of the aircraft 120. In some such examples, the flight project handler 230 may identify one or more flight stages based on the flight project. For example, the flight project handler 230 may determine that the flight project is to implement a flight operation corresponding to the aircraft 120 flying from the launch location 130 to the landing location 134. In some such examples, the flight project handler 230 may identify a pre-flight stage, an in-flight stage, and a post-flight stage to implement the flight operation.

In some examples, the flight project handler 230 identifies flight project roles based on a checklist to execute actions of the checklist. For example, the flight project handler 230 may identify one or more flight project roles based on a checklist including actions to implement the pre-flight stage. In some such examples, the flight project handler 230 may identify a control operator flight role and a ground crew flight role to execute the actions to implement the pre-flight stage of the flight project.

In some examples, the flight project handler 230 may associate the flight project, the identifier, the one or more flight stages, the one or more flight project roles, the one or more checklists, etc., and/or a combination thereof, in a database. For example, the flight project handler 230 may instruct the central server 102 to generate the flight project and store the flight project in one or more databases. In some such examples, the flight project handler 230 may instruct the central server 102 to generate and/or store the flight project to include the identifier, the one or more flight stages, the one or more flight project roles, the one or more checklists, etc., and/or a combination thereof, in the one or more databases. Advantageously, the flight project handler 230 may cause the central server 102 to enable the flight project to be accessible by one(s) of the client devices 104, 106, 108, 110, 112, 114, 116 in substantially real-time to view, execute, and/or validate checklist actions.

In some examples, the flight project handler 230 may select another flight project to complete. For example, the flight project handler 230 may determine to generate another flight project associated with the aircraft 120 of FIG. 1 or a different aircraft. In some examples, the flight project handler 230 may identify a flight project to be accessed by client devices via a network. For example, the first aircraft personnel 124 may identify a flight project associated with the aircraft 120. In some such examples, the first aircraft personnel 124 may select the flight project by utilizing the user interface 220 on the sixth client device 114.

In some examples, the flight project handler 230 detects a flight project role based on a type of the client device 200. For example, the flight project handler 230 may detect that the first client device 104 corresponds to a control operator flight project role, the second client device 106 corresponds to a ground crew flight project role, the third client device 108 corresponds to a visual observer role, etc., based on a respective type of the first client device 104, the second client device 106, the third client device 108, etc.

In some examples, the flight project handler 230 identifies actions (e.g., checklist actions) based on the flight project role and a checklist. For example, the flight project handler 230 may determine that a checklist to implement the pre-flight stage of the flight project includes one or more checklist actions to be executed by the flight project role. In some such examples, the flight project handler 230 may provide the identified one or more checklist actions to the user interface 220 for presentation to a user.

In some examples, the flight project handler 230 determines whether to complete another flight stage after a preceding flight stage has been completed. For example, a control operator and the first aircraft personnel 124 may complete the actions to implement the pre-flight stage of the flight project. In some such examples, the flight project handler 230 may determine that the in-flight stage is to be completed in response to the completion of the pre-flight stage. In some such examples, the flight project handler 230 may provide one or more checklist actions, which correspond to the in-flight stage, to the user interface 220 for presentation to a user for completion of the in-flight stage.

In the illustrated example of FIG. 2, the client device 200 includes the checklist handler 240 to generate a checklist (e.g., an aircraft checklist, a collaborative aircraft checklist, etc.) including actions to complete in sequence to execute a flight stage of a flight project. In some examples, the checklist handler 240 generates a first checklist including first checklist actions that, when completed, implement a pre-flight stage of a flight operation of the aircraft 120. In some examples, the checklist handler 240 generates a second checklist including second checklist actions that, when completed, implement an in-flight stage of the flight operation of the aircraft 120. In some examples, the checklist handler 240 generates a third checklist including third checklist actions that, when completed, implement a post-flight stage of the flight operation of the aircraft 120.

In some examples, the checklist handler 240 generates the first checklist based on at least one of a flight stage of the flight project or an identifier of the aircraft 120. For example, the checklist handler 240 may determine a type of the aircraft 120 based on the identifier, such as a tail number. In some such examples, the checklist handler 240 may map the tail number to the type of the aircraft 120 in a database of the central server 102. In some such examples, the checklist handler 240 may identify the first checklist actions based on the mapping. For example, the checklist handler 240 may determine that to implement the pre-flight stage of the flight operation of a type of aircraft such as the aircraft 120, the first checklist actions are to be completed (e.g., completed in sequence) to implement the pre-flight stage.

In some examples, the checklist handler 240 executes the checklists. For example, the checklist handler 240 may cause, effectuate, and/or otherwise facilitate the execution of the checklist actions of the first checklist, the second checklist, and/or the third checklist. In some such examples, the checklist handler 240 may execute the checklists by viewing, executing, and/or validating the checklist actions included in the checklists.

In some examples, the checklist handler 240 identifies whether an update to a checklist action of a checklist by the client device 200 has occurred. For example, the checklist handler 240 may identify that a first checklist action of the first checklist actions has been updated by the first aircraft personnel 124. In some such examples, the checklist handler 240 may identify the update in response to the user interface

220 receiving an edit to the first checklist action. In some examples, the checklist handler 240 may identify the update in response to the user interface 220 receiving an indication that the first checklist action has been completed or validated by the first aircraft personnel 124.

In some examples, in response to identifying the update, the checklist handler 240 may update the first checklist action. For example, the checklist handler 240 may instruct the user interface 220 to update the first checklist action to have a first indication of not complete to a second indication of complete. In some such examples, the checklist handler 240 may enable a second checklist action of the first checklist actions. For example, the second checklist action may be completed after the first checklist action. In some such examples, the checklist handler 240 may instruct the user interface 220 to enable the second checklist action to be viewed, modified, executed, validated, etc. In some such examples, the first aircraft personnel 124 may not be able to view, modify, execute, validate, etc., the second checklist action until enabled by the checklist handler 240.

In some examples, the checklist handler 240 transmits an indication of the update to the central server 102. For example, in response to obtaining the indication of the update, the central server 102 may update the first checklist action of the first checklist, which may be stored by the central server 102 for access by different client device(s). In some such examples, the central server 102 may propagate and/or otherwise distribute the update to the first checklist action to subscribing one(s) of the client devices 104, 106, 108, 110, 112, 114, 116.

In some examples, the checklist handler 240 of the client device 200 obtains an alert, an indication, a notification, etc., that the second checklist action of the first checklist actions has been completed by a different flight project role, such as a control operator. For example, the checklist handler 240 may direct the user interface 220 to present a notification to the first aircraft personnel 124 that the control operator has completed the second checklist action. In some such examples, the first aircraft personnel 124 may validate the second checklist action. In some such examples, the checklist handler 240 may transmit an indication of the validation to the central server 102. For example, in response to obtaining the validation of the second checklist action, the central server 102 may update the second checklist action of the first checklist, which may be stored by the central server 102 for access by different client device(s). In some such examples, the central server 102 may propagate and/or otherwise distribute the update to the second checklist action to subscribing one(s) of the client devices 104, 106, 108, 110, 112, 114, 116.

In some examples, the checklist handler 240 determines whether the first checklist is complete. For example, the checklist handler 240 may determine that the one or more first actions have been completed by the first aircraft personnel 124. In some such examples, the checklist handler 240 may determine that the one or more first actions have been completed by the first aircraft personnel 124 and validated by a different flight project role, such as a control operator. In some examples, the checklist handler 240 determines that the flight stage is complete in response to a completion of the first checklist. For example, the checklist handler 240 may determine that the pre-flight stage is complete in response to a determination that the first checklist is complete and/or validated.

In the illustrated example of FIG. 2, the client device 200 includes the message handler 250 to generate a message including an update of a checklist action and/or receive a message including the update. In some examples, the message handler 250 may determine that the first checklist action of the first checklist has been executed or validated. In some such examples, the message handler 250 may generate a first message (e.g., an HTTP message, an HTTPS message, etc.), including one or more data packets. For example, the message handler 250 may generate an HTTP message including data (e.g., a payload) indicative of the update to the checklist action. In some such examples, the message handler 250 may instruct the communication interface 210 to transmit the first message to the central server 102.

In some examples, in response to obtaining the first message, the central server 102 may validate the update indicated by the first message to ensure that the update is a proper update (e.g., the update does not violate a checklist rule, a syntax rule, etc., that manage the first checklist). The central server 102 may generate a second message including data indicative of the validation. The central server 102 may transmit the second message to the first client device 104. In response to obtaining the second message, the checklist handler 240 may update the first checklist on the first client device 104 to indicate that the update is validated.

In the illustrated example of FIG. 2, the client device 200 includes the validation handler 260 to validate an update to a checklist action. In some examples, the checklist handler 240 obtains an update, which may be made by the first client device 104, to the first checklist action of the first checklist. In some such examples, the checklist handler 240 may obtain an input from the first aircraft personnel 124 indicative of a validation of the update. For example, the first client device 104 may execute the first checklist action of remotely powering on the aircraft 120 during a pre-flight stage. In some such examples, the first aircraft personnel 124 may visually validate that the aircraft 120 is powered on and may provide an input to the validation handler 260 (via the user interface 220) of the client device 200 to validate the execution of the first checklist action.

In some examples, the validation handler 260 validates the update based on a measurement (e.g., an aircraft measurement). For example, in response to being remotely powered on, the aircraft 120 may transmit aircraft measurements including a power measurement to the central server 102. The power measurement may be a voltage of a battery of the aircraft 120, a level of fuel onboard the aircraft 120, etc. In some such examples, the validation handler 260 may retrieve the aircraft measurements from the central server 102 and display the aircraft measurements (or portion(s) thereof) to the first aircraft personnel 124. In some such examples, the first aircraft personnel 124 may provide an input to the validation handler 260 to validate the first checklist action and the validation handler 260 may confirm the validation based on the aircraft measurement(s) indicative of the aircraft 120 being powered on.

In the illustrated example of FIG. 2, the client device 200 includes the aircraft controller 270 to cause an aircraft to execute a flight stage based on an update of a checklist. For example, in response to the first checklist action to power on the aircraft 120, the aircraft controller 270 may generate a command (e.g., an aircraft control command) to direct the aircraft 120 to initiate take off to execute the pre-flight stage and transition to the in-flight stage. In some examples, the aircraft controller 270 may generate a command to adjust a flight path (e.g., change one or more waypoints) of the aircraft 120, adjust a flight parameter such as an altitude, an airspeed, a pitch, etc., of the aircraft 120 while the aircraft 120 is in flight to execute the in-flight stage.

While an example manner of implementing one(s) of the client devices 104, 106, 108, 110, 112, 114, 116 of FIG. 1 is illustrated in FIG. 2, one or more of the elements, processes and/or devices illustrated in FIG. 2 may be combined, divided, re-arranged, omitted, eliminated, and/or implemented in any other way. Further, the example communication interface 210, the example user interface 220, the example flight project handler 230, the example checklist handler 240, the example message handler 250, the example validation handler 260, the example aircraft controller 270, the example bus 280, and/or, more generally, the example client devices 102, 104, 106, 108, 110, 112, 114, 116 of FIG. 1 and/or the example client device 200 of FIG. 2 may be implemented by hardware, software, firmware, and/or any combination of hardware, software, and/or firmware. Thus, for example, any of the example communication interface 210, the example user interface 220, the example flight project handler 230, the example checklist handler 240, the example message handler 250, the example validation handler 260, the example aircraft controller 270, the example bus 280, and/or, more generally, the example client devices 102, 104, 106, 108, 110, 112, 114, 116 of FIG. 1 and/or the example client device 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) (e.g., field programmable gate array(s) (FPGA(s))). When reading any of the apparatus or system claims of this patent to cover a purely software and/or firmware implementation, at least one of the example communication interface 210, the example user interface 220, the example flight project handler 230, the example checklist handler 240, the example message handler 250, the example validation handler 260, the example aircraft controller 270, and/or the example bus 280 is/are hereby expressly defined to include a non-transitory computer readable storage device or storage disk such as a memory, a digital versatile disk (DVD), a compact disk (CD), a Blu-ray disk, etc., including the software and/or firmware. Further still, the example client devices 104, 106, 108, 110, 112, 114, 116 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
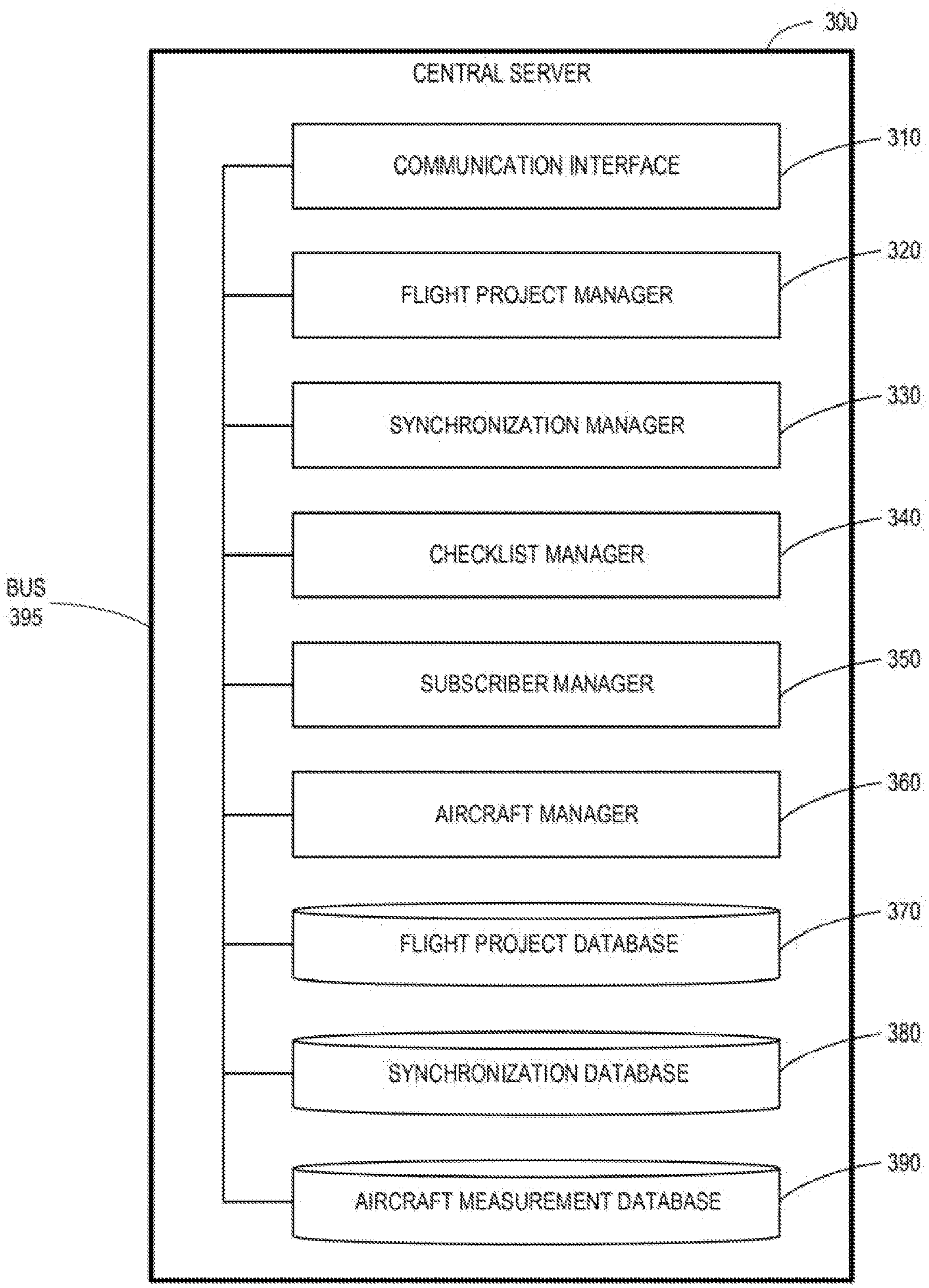
FIG. 3 is a block diagram of an example implementation of the central server of FIG. 1.

FIG. 3 is a block diagram of an example implementation of a central server 300. The central server 300 may effectuate a flight stage of the aircraft 120. For example, the central server 300 may generate, maintain, and/or synchronize a checklist to be accessed by a plurality of client devices, such as the client devices 104, 106, 108, 110, 112, 114, 116 of FIG. 1. In some such examples, the central server 300 may allow a user, such as one(s) of the aircraft personnel 124, 126, 128 of FIG. 1, to view, execute, and/or validate the checklist action and synchronize any modification(s) thereof amongst the checklists on the respective ones of the client devices 104, 106, 108, 110, 112, 114, 116. In some examples, the central server 300 of FIG. 3 may implement the central server 102 of FIG. 1.

In the illustrated example of FIG. 3, the central server 300 includes an example communication interface 310, an example flight project manager 320, an example synchronization manager 330, an example checklist manager 340, an example subscriber manager 350, an example aircraft manager 360, an example flight project database 370, an example synchronization database 380, an example aircraft measurement database 390, and an example bus 395. In this example, the communication interface 310, the flight project manager 320, the synchronization manager 330, the checklist manager 340, the subscriber manager 350, the aircraft manager 360, the flight project database 370, the synchronization database 380, and the aircraft measurement database 390 are in communication with one(s) of each other via the bus 395. For example, the bus 395 may implement at least one of an I2C bus, a SPI bus, or a PCI bus. Additionally or alternatively, the bus 395 may implement any other type of computing or electrical bus.

In the illustrated example of FIG. 3, the central server 300 includes the communication interface 310 to obtain information from and/or transmit information to the network 122 of FIG. 1. In some examples, the communication interface 310 transmits checklist modifications (e.g., an update, an edit, a completion, etc., of a checklist action) to one(s) of the client devices 104, 106, 108, 110, 112, 114, 116 of FIG. 1. In some examples, the communication interface 310 receives and/or otherwise obtains checklist notifications (e.g., a notification indicating that a checklist action has been modified, executed, validated, etc.) form one(s) of the client devices 104, 106, 108, 110, 112, 114, 116 of FIG. 1

In some examples, the communication interface 310 implements a web server that receives the information from the network 122 and/or transmits the information to the network 122. In some examples, the communication interface 310 formats the information as HTTP message(s). However, the communication interface 310 may utilize any other message format and/or protocol such as, for example, FTP, SMTP, HTTPS protocol, etc. In some examples, the communication interface 310 implements a client/server communication session between the one(s) of the client devices 104, 106, 108, 110, 112, 114, 116 of FIG. 1 and the central server 102. For example, the communication interface 310 may push data to the one(s) of the client devices 104, 106, 108, 110, 112, 114, 116 of FIG. 1 on an asynchronous or synchronous basis.

In the illustrated example of FIG. 3, the central server 300 includes the flight project manager 320 to generate a flight project to implement a flight operation of the aircraft 120. In some examples, the flight project manager 320 receives a request by the first client device 104 to generate a flight project to facilitate the aircraft 120 flying from the launch location 130 to the landing location 134. The flight project manager 320 may identify one or more flight stages to facilitate the flight operation. The flight project manager 320 may identify one or more checklists corresponding to a respective one of the one or more flight stages. The flight project manager 320 may identify the one or more checklists based on an identifier of the aircraft 120.

In some examples, the flight project manager 320 generates the flight project by storing the flight project in the flight project database 370. For example, the flight project manager 320 may store the one or more flight stages, the one or more aircraft identifiers, the one or more checklists (and/or one or more checklist actions included thereof), one or more flight project roles, and/or one or more client subscribers in the flight project database 370 as being associated with the flight project.

In some examples, the flight project manager 320, and/or, more generally, the central server 300, hosts the client application 118 of FIG. 1. For example, the flight project manager 320 may store user interface data in the flight project database 370. In some such examples, the flight project manager 320 may store HyperText Markup Language (HTML) objects, JavaScript objects, Extensible Markup Language (XML) objects, Document Object Models (DOMs), etc., in the flight project database 370. In some such examples, the client devices 104, 106, 108, 110, 112, 114, 116 may launch a user interface in response to accessing the HTML objects, the JavaScript objects, etc., stored and/or otherwise hosted by the flight project database 370.

In the illustrated example of FIG. 3, the central server 300 includes the synchronization manager 330 to synchronize checklists across different one(s) of the client devices 104, 106, 108, 110, 112, 114, 116. In some examples, the synchronization manager 330 stores a first update to a checklist action that is received from one of the client devices 104, 106, 108, 110, 112, 114, 116 in the synchronization database 380.

In some examples, the synchronization manager 330 determines whether there is a synchronization conflict in connection with the first update. For example, the synchronization manager 330 may identify that a second update to the checklist action is stored in the synchronization database 380. In some such examples, the synchronization manager 330 may select which one(s) of the first update and/or the second update to execute, process, etc., based on an order priority of the update requests. For example, the synchronization manager 330 may select the first update to process based on the first update being received at a first time prior to a second time at which the second update is received. In some such examples, in response to not selecting the second update, the synchronization manager 330 may generate an alert indicative of a rejection of the non-selected update request (e.g., the second update). For example, the synchronization manager 330 may invoke the communication interface 310 to transmit an alert to the one of the client devices 104, 106, 108, 110, 112, 114, 116 that provided the second update.

In the illustrated example of FIG. 3, the central server 300 includes the checklist manager 340 to manage, monitor, and/or otherwise control the execution of checklists stored in the flight project database 370. validate an update request to a checklist action of a checklist. In some examples, the checklist manager 340 validates an update request to a checklist. For example, the checklist manager 340 may determine whether a request to update a first checklist action of the checklist is valid. In some such examples, the checklist manager 340 may determine that the request is valid based on a permission rule (e.g., a requesting client device has the adequate level of permission to edit the first checklist action), a checklist rule (e.g., the first checklist action may be modified in such a manner as indicated by the request), a syntax rule (e.g., a checklist parameter has the required units of measure, a checklist action has a proper associated response such as not complete, complete, or validated, etc.), etc., and/or a combination thereof, not being violated.

In some examples, the checklist manager 340 updates a checklist stored in the flight project database 370. For example, in response to the synchronization manager 330 selecting the first update to be processed, the checklist manager 340 may update the checklist based on the first update.

In the illustrated example of FIG. 3, the central server 300 includes the subscriber manager 350 to identify client subscriber(s) of a flight project associated with an aircraft. In some examples, one(s) of the client devices 104, 106, 108, 110, 112, 114, 116 subscribe to a flight project stored in the flight project database 370. For example, the first aircraft personnel 124 may utilize the sixth client device 114 to select a flight project associated with a flight operation of the aircraft 120. In some such examples, in response to the selection, the sixth client device 114 may transmit a message (e.g., a subscribe message) to the subscriber manager 350 indicating that the sixth client device 114 is to be associated with the flight project. In some such examples, the subscriber manager 350 may subscribe the sixth client device 114 via a subscriber service (e.g., one or more application programming interfaces (APIs)).

In some examples, the subscriber manager 350 publishes, sends, and/or pushes updates to checklist(s) associated with the flight project. For example, the subscriber manager 350 may identify one or more client subscribers associated with the flight project and transmit updates to the one or more identified client subscribers. Advantageously, in response to subscribing to the flight project, the first aircraft personnel 124 may be notified of changes, updates, completions, etc., of the checklist and thereby may be notified of the progress at which the checklist is being completed.

In the illustrated example of FIG. 3, the central server 300 includes the aircraft manager 360 to manage, monitor, and/or otherwise control a flight operation of the aircraft 120. In some examples, the aircraft manager 360 may transmit a command via the network 122 to control the aircraft 120. For example, the aircraft manager 360 may generate a command to adjust a flight path (e.g., change one or more waypoints) of the aircraft 120, adjust a flight parameter such as an altitude, an airspeed, a pitch, etc., of the aircraft 120 while the aircraft 120 is in flight, etc.

In some examples, the aircraft manager 360 obtains aircraft measurements from the aircraft 120 via the network 122. For example, the aircraft manager 360 may receive measurements generated by a computing device and/or sensor(s) of the aircraft 120, a device monitoring the aircraft 120 such as a satellite or a terrestrial monitoring system (e.g., a ground radar system), etc., and/or a combination thereof. In some such examples, the aircraft manager 360 may receive measurements including an altitude, an airspeed, a pitch (e.g., a pitch angle), etc., of the aircraft 120.

In some examples, the aircraft manager 360 may cause the aircraft 120 to execute a flight stage based on an update of a checklist. For example, the aircraft manager 360 may generate a command (e.g., an aircraft control command) to direct the aircraft 120 to initiate take off to execute the pre-flight stage and transition to the in-flight stage in response to an update, completion, etc., of a checklist that corresponds to the pre-flight stage.

In the illustrated example of FIG. 3, the central server 300 includes the flight project database 370 to record data such as flight projects, flight stages, aircraft identifiers, checklists, checklist actions, flight project roles, client subscribers, the client application 118, etc. The flight project database 370 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The flight project database 370 may additionally or alternatively be implemented by one or more double data rate (DDR) memories, such as DDR, DDR2, DDR3, DDR4, mobile DDR (mDDR), etc. The flight project database 370 may additionally or alternatively be implemented by one or more mass storage devices such as hard disk drive(s) (HDD(s)), compact disk (CD) drive(s), digital versatile disk (DVD) drive(s), solid-state disk (SSD) drive(s), etc. While in the illustrated example the flight project database 370 is illustrated as a single database, the flight project database 370 may be implemented by any number and/or type(s) of databases. Furthermore, the data stored in the flight project database 370 may be in any data format such as, for example, binary data, comma delimited data, tab delimited data, structured query language (SQL) structures, etc.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list or in any other form.

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of corresponding information in a different physical form or forms.

In the illustrated example of FIG. 3, the central server 300 includes the synchronization database 380 to record data such as checklist updates, timestamps, order priorities, buffers (e.g., first-in first out (FIFO) buffers). The synchronization database 380 may be implemented by a volatile memory (e.g., an SDRAM, a DRAM, an RDRAM, etc.) and/or a non-volatile memory (e.g., flash memory). The synchronization database 380 may additionally or alternatively be implemented by one or more DDR memories, such as DDR, DDR2, DDR3, DDR4, mDDR, etc. The synchronization database 380 may additionally or alternatively be implemented by one or more mass storage devices such as HDD(s), CD drive(s), DVD drive(s), SSD drive(s), etc. While in the illustrated example the synchronization database 380 is illustrated as a single database, the synchronization database 380 may be implemented by any number and/or type(s) of databases. Furthermore, the data stored in the synchronization database 380 may be in any data format such as, for example, binary data, comma delimited data, tab delimited data, SQL structures, etc.

In the illustrated example of FIG. 3, the central server 300 includes the aircraft measurement database 390 to record data such as aircraft measurements, aircraft sensor measurements, aircraft computing device measurements, terrestrial monitoring system measurements (e.g., radar measurements), etc., associated with the aircraft 120. The aircraft measurement database 390 may be implemented by a volatile memory (e.g., an SDRAM, a DRAM, an RDRAM, etc.) and/or a non-volatile memory (e.g., flash memory). The aircraft measurement database 390 may additionally or alternatively be implemented by one or more DDR memories, such as DDR, DDR2, DDR3, DDR4, mDDR, etc. The aircraft measurement database 390 may additionally or alternatively be implemented by one or more mass storage devices such as HDD(s), CD drive(s), DVD drive(s), SSD drive(s), etc. While in the illustrated example the aircraft measurement database 390 is illustrated as a single database, the aircraft measurement database 390 may be implemented by any number and/or type(s) of databases. Furthermore, the data stored in the aircraft measurement database 390 may be in any data format such as, for example, binary data, comma delimited data, tab delimited data, SQL structures, etc.

While an example manner of implementing the central server 102 of FIG. 1 is illustrated in FIG. 3, one or more of the elements, processes, and/or devices illustrated in FIG. 3 may be combined, divided, re-arranged, omitted, eliminated and/or implemented in any other way. Further, the example communication interface 310, the example flight project manager 320, the example synchronization manager 330, the example checklist manager 340, the example subscriber manager 350, the example aircraft manager 360, the example flight project database 370, the example synchronization database 380, the example aircraft measurement database 390, the example bus 395, and/or, more generally, the example central server 102 of FIG. 1 and/or the example central server 300 of FIG. 3 may be implemented by hardware, software, firmware and/or any combination of hardware, software and/or firmware. Thus, for example, any of the example communication interface 310, the example flight project manager 320, the example synchronization manager 330, the example checklist manager 340, the example subscriber manager 350, the example aircraft manager 360, the example flight project database 370, the example synchronization database 380, the example aircraft measurement database 390, the example bus 395, and/or, more generally, the example central server 102 of FIG. 1 and/or the example central server 300 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) (e.g., FPGA(s)). When reading any of the apparatus or system claims of this patent to cover a purely software and/or firmware implementation, at least one of the example communication interface 310, the example flight project manager 320, the example synchronization manager 330, the example checklist manager 340, the example subscriber manager 350, the example aircraft manager 360, the example flight project database 370, the example synchronization database 380, the example aircraft measurement database 390, and/or the example bus 395 is/are hereby expressly defined to include a non-transitory computer readable storage device or storage disk such as a memory, a DVD, a CD, a Blu-ray disk, etc., including the software and/or firmware. Further still, the example central server 102 of FIG. 1 may include one or more elements, processes and/or devices in addition to, or instead of, those illustrated in FIG. 3, and/or may include more than one of any or all of the illustrated elements, processes and devices.

Figure 4:
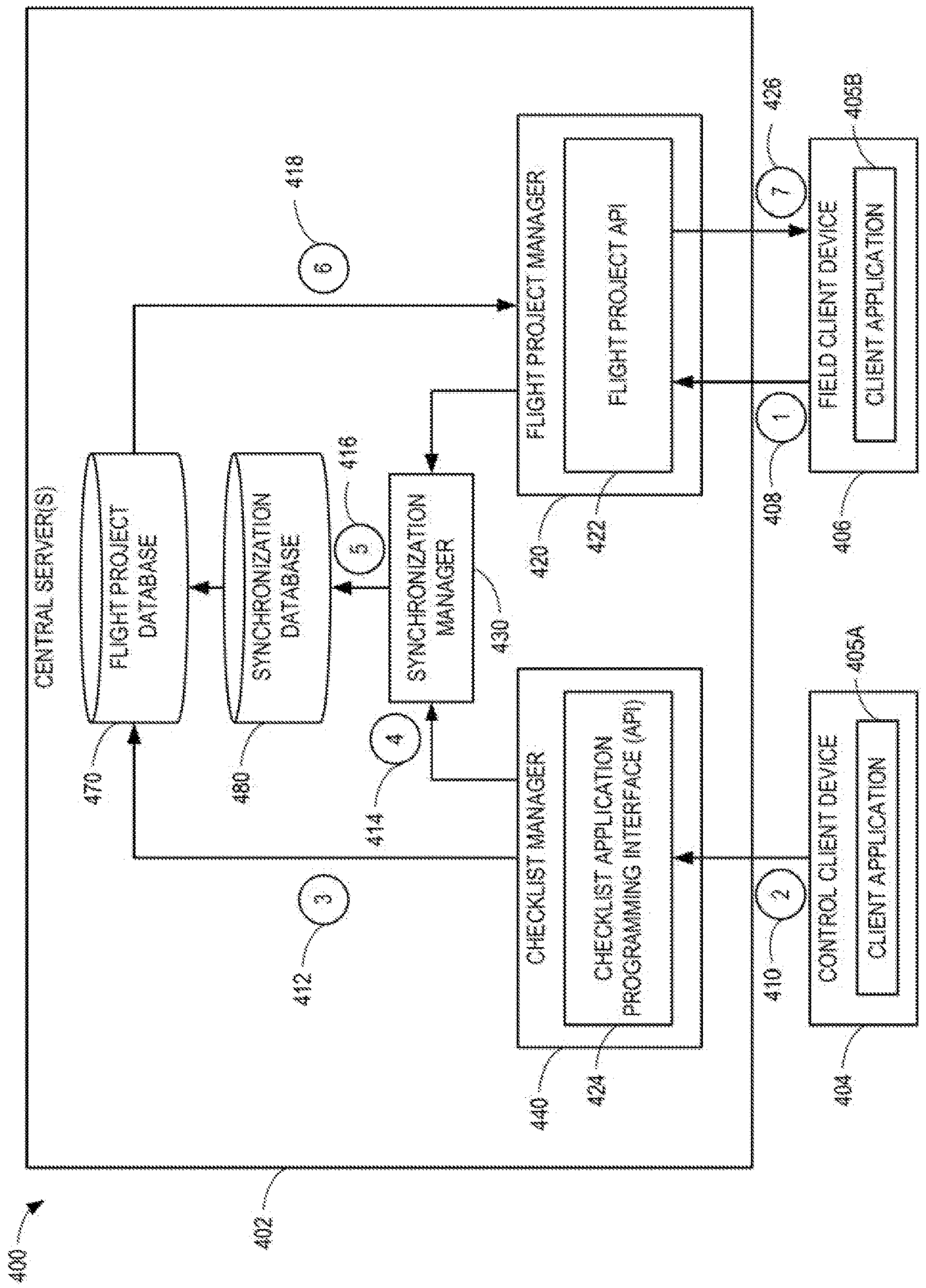
FIG. 4 is a first example flight management workflow to facilitate the flight of the example aircraft of FIG. 1.

FIG. 4 is a first example flight management workflow 400 to facilitate the flight of the aircraft 120 of FIG. 1. For example, the first flight management workflow 400 may be implemented to generate and/or otherwise instantiate a checklist. The first flight management workflow 400 includes example central server(s) 402 including an example flight project manager 420, an example synchronization manager 430, an example checklist manager 440, an example flight project database 470, and an example synchronization database 480. In some examples, the central server(s) 402 may implement one or more servers, one or more of which may be physically located in different geographical locations. In some examples, the central server(s) 402 may implement one or more virtual servers composed of virtualized hardware (e.g., virtualizations of compute, memory, network, and/or storage hardware resources) provided by a cloud computing provider. In some examples, the central server(s) 402 may implement the central server 102 of FIG. 1 and/or the central server 300 of FIG. 3.

In some examples, the flight project manager 420 of FIG. 4 may implement the flight project manager 320 of FIG. 3. In some examples, the synchronization manager 430 of FIG. 4 may implement the synchronization manager 330 of FIG. 3. In some examples, the checklist manager 440 of FIG. 4 may implement the checklist manager 340 of FIG. 3. In some examples, the flight project database 470 of FIG. 4 may implement the flight project database 370 of FIG. 3. In some examples, the synchronization database 480 of FIG. 4 may implement the synchronization database 380 of FIG. 3.

In the first flight management workflow 400, the central server(s) 402 is/are in communication with an example control client device 404 and an example field client device 406. In this example, the control client device 404 and the field client device 406 implement and/or otherwise include a respective example client application 405A, 405B including a first example client application 405A and a second example client application 405B. In some examples, the client application 405A, 405B may implement the client application 118 of FIG. 1. For example, the first client application 405A may implement the client application 118 and have a first GUI and the second client application 405B may implement the client application 118 and have a second GUI different from the first GUI. In some examples, the client application 405A, 405B may implement the communication interface 210, the user interface 220, the flight project handler 230, the checklist handler 240, the message handler 250, the validation handler 260, the aircraft controller 270, and/or the bus 280 of FIG. 2.

In some examples, the control client device 404 may implement a client device utilized by a control operator. For example, the control operator may be coordinating, monitoring, and/or controlling an execution of a checklist of a flight operation of the aircraft 120 from a central location, such as a mission control center, a flight control center, a flight management center, a flight operations center, etc. In some such examples, the control client device 404 may implement the first client device 104 of FIG. 1. Alternatively, the control client device 404 may implement a different one of the client devices 104, 106, 108, 110, 112, 114, 116 of FIG. 1.

In some examples, the field client device 406 may implement a client device utilized by a field operator. For example, the field operator may not be in the central location, but instead proximate to the aircraft 120 at the launch location 130, at the visual observation location 132, or at the landing location 134. In some such examples, the field client device 406 may implement the sixth client device 114 or the seventh client device 116 of FIG. 1. Alternatively, the field client device 406 may implement a different one of the client devices 104, 106, 108, 110, 112, 114, 116 of FIG. 1.

The first flight management workflow 400 of FIG. 4 includes a first example operation 408, a second example operation 410, a third example operation 412, a fourth example operation 414, a fifth example operation 416, and a sixth example operator 418. During the first operation 408, the field client device 406 selects a flight project associated with implementing a flight operation of the aircraft 120 of FIG. 1. During the first operation 408, the field client device 406 transmits a request (e.g., a request using Server-Sent Events) to an example flight project API 422, which is implemented by the flight project manager 420. For example, the Server-Sent Event implemented by the request may keep a constant connection open between the central server(s) 402 and the second client application 405B to allow event data, message data, etc., related to the flight project to be pushed to the second client application 405B. During the first operation 408, in response to receiving the request, the central server(s) 402 may establish a subscriber client with the flight project manager 420 to be made aware of event data, message data, etc., related to the aircraft 120 and/or associated checklist(s).

During a second example operation 410, the first client application 405A generates an association of an aircraft tail number (e.g., an aircraft tail number of the aircraft 120 of FIG. 1) and an aircraft flight operation or procedure, such as flying from the launch location 130 to the landing location 134. During the second operation 410, the first client application 405A generates a checklist to cause the checklist to become an in-progress checklist. During the second operation 410, the first client application 405A may send an HTTP POST message with the checklist to an example checklist API 424 implemented by the checklist manager 440 of FIG. 4.

During a third example operation 412, the checklist manager 440 stores a flight project associated with the aircraft tail number and the aircraft flight operation in the flight project database 470. Advantageously, the checklist manager 440 may store the flight project in the flight project database 470 to cause the flight project to become accessible by a plurality of client devices, such as the control client device 404 and the field client device 406.

During the fourth operation 414, the checklist manager 440 validates the checklist to ensure that the checklist comports with corresponding checklist rules, syntax rules, etc. During the fourth operation 414, the checklist manager 440 provides the checklist to the synchronization manager 430 for storage in the synchronization database 480.

During the fifth operation 416, the synchronization manager 430 may determine whether there are any conflicting updates to the checklist, redundant or erroneous instances of the checklist, etc., created by a different client device. During the fifth operation 416, the synchronization manager 430 may instruct the synchronization database 480 to move the checklist from the synchronization database 480 to the flight project database 470 in response to determining that there are no conflicting updates to the checklist. In response to moving the checklist to the flight project database 470, the synchronization manager 430 may associate the flight project with the checklist.

During the sixth operation 418, the flight project manager 420 determines that the flight project has an update corresponding to the association of the checklist and the flight project. During the sixth operation 418, the flight project manager 420 identifies the field client device 406 has a client subscriber and pushes the checklist or portion(s) thereof from the flight project database 470 to the field client device 406 via the flight project API 422 as an HTTP POST message. For example, the second client application 405B may push the HTTP POST message as a Server-Sent Event through the connection established during the first operation 408 to allow event data, message data, etc., related to the flight project to be pushed to the second client application 405B.

Figure 5:
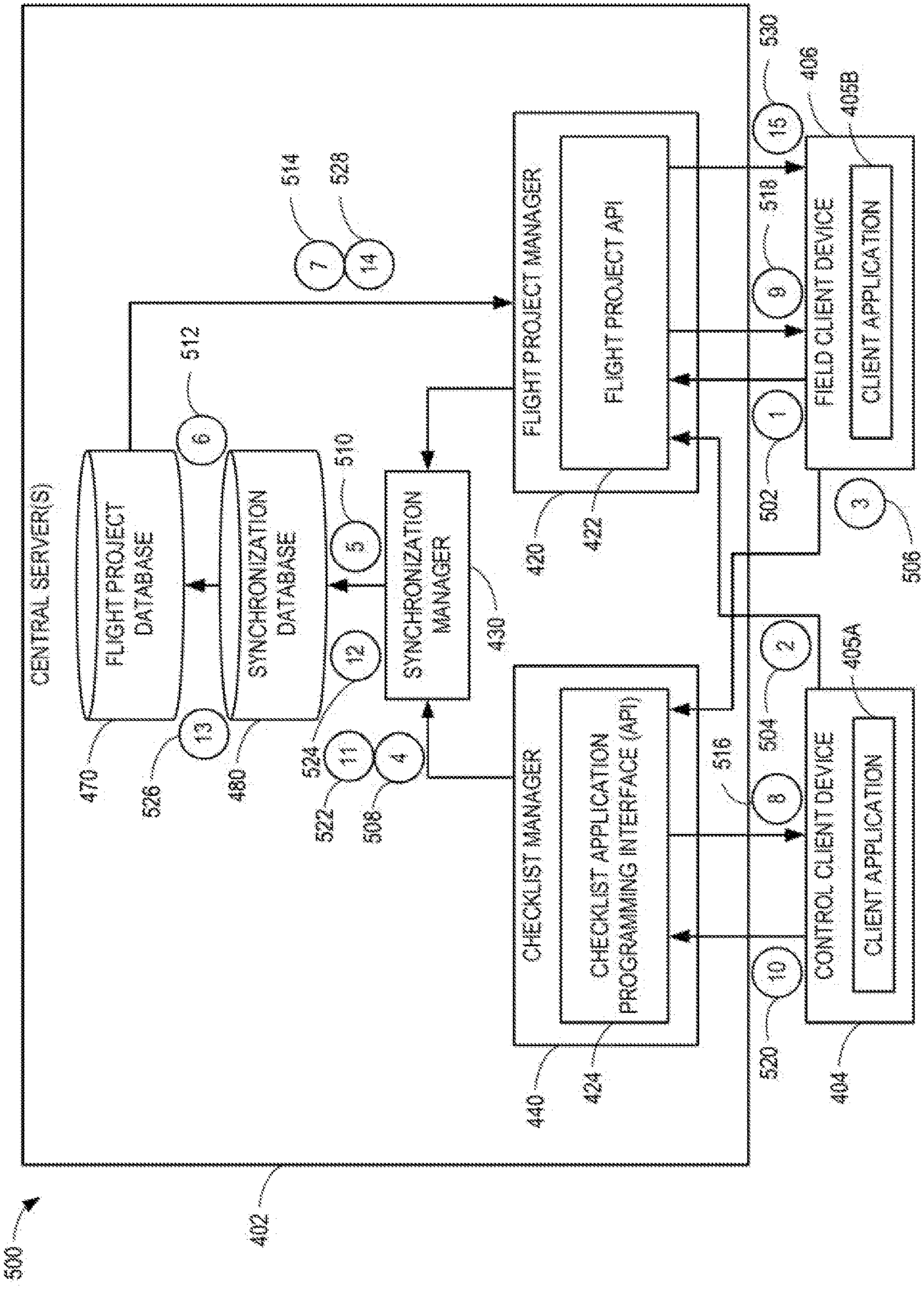
FIG. 5 is a second example flight management workflow to facilitate the flight of the example aircraft of FIG. 1.

FIG. 5 is a second example flight management workflow 500 to facilitate the flight of the aircraft 120 of FIG. 1. For example, the second flight management workflow 500 may be implemented to update a checklist action of a checklist. The second flight management workflow 500 includes the central server(s) 402, control client device 404, the first client application 405A, the field client device 406, the second client application 405B, the flight project manager 420, the flight project API 422, the checklist API 424, the synchronization manager 430, the checklist manager 440, the flight project database 470, and the synchronization database 480 of FIG. 4.

During a first example operation 502, the field client device 406 may launch a user interface implemented by the second client application 405B. During the first operation 502, the second client application 405B may select a flight project stored in the flight project database 470. The second client application 405B may transmit a request (e.g., a request using Server-Sent Events) to the flight project API 422 for data associated with the flight project. In some examples, the request may establish a connection (e.g., a constant connection) between the central server(s) 402 and the field client device 406 to effectuate any event data relates to the flight project to be pushed to the second client application 405B. For example, in response to obtaining the request from the second client application 405B, the flight project manager 420 may generate a subscriber client with the flight project API 422 to push event data associated with a checklist, the flight project, etc., that is associated with the aircraft 120 of FIG. 1 to the second client application 405B.

During a second example operation 504, the control client device 404 transmits a request (e.g., a request using Server-Sent Events) to the flight project API 422 for data associated with the flight project. In some examples, the request may establish a connection (e.g., a constant connection) between the central server(s) 402 and the control client device 404 to effectuate any event data relates to the flight project to be pushed to the first client application 405A. In some such examples, the flight project manager 420 may generate a subscriber client with the flight project API 422 to push event data associated with the checklist to the first client application 405A. In some such examples, the flight project manager 420 may filter the subscriber client associated with the control client device 404 to receive updates for the checklist.

During a third example operation 506, an aircraft personnel, such as the first aircraft personnel 124 of FIG. 1, may utilize the second client application 405B to complete a checklist action of the checklist (e.g., mark or select "done", "complete," etc., on the checklist action to indicate that the checklist action is completed). During the third operation 506, in response to the completion of the checklist action on the second client application 405B, the second client application 405B may generate an HTTP POST message to the checklist API 424. For example, the second client application 405B may identify that the completion of the checklist is to be notified and/or otherwise routed to the checklist API 424 rather than the flight project API 422.

During a fourth example operation 508, the checklist manager 440 may push the completion of the checklist action as an update to the synchronization manager 430. For example, the checklist manager 440 may transmit a checklist item update request to the synchronization manager 430. In some such examples, the checklist manager 440 may generate the checklist item update request to include an identifier of the first aircraft personnel 124 (e.g., a username, a login credential, etc.) and/or the field client device 406 (e.g., a media access control (MAC) address, an Internet Protocol (IP) address, a manufacturer and/or vendor identifier of the field client device 406, etc.).

During a fifth example operation 510, the synchronization manager 430 stores the update to the checklist action in the synchronization database 480. During a sixth example operation 512, in response to the synchronization manager 430 validating the update, the synchronization manager 430 instructs the synchronization database 480 to push the update to the flight project database 470.

During a seventh example operation 514, the flight project manager 420 identifies that the update to the checklist has been made. During the seventh operation 514, the flight project manager 420 retrieves the update. During an eighth example operation 516 and a ninth example operation 518, the flight project manager 420 pushes the update substantially simultaneously to client subscribers to the flight project, such as the control client device 404 and the field client device 406.

During a tenth example operation 520, a control operator utilizing the control client device 404 may utilize the first client application 405A to validate the update. For example, the control operator may determine that the first aircraft personnel 124 successfully completed the checklist action. In some such examples, the control operator may validate the checklist action (e.g., by marking "validate" or the like on the checklist action updated by the first aircraft personnel 124) on the first client application 405A. In response to the validation, the first client application 405A pushes an update, such as acknowledge or acknowledgment update, as an HTTP POST message to the checklist API 424.

During an eleventh example operation 522, the checklist manager 440 pushes the validation of the checklist action to the synchronization manager 430. During a twelfth example operation 524, the synchronization manager 430 pushes the validation of the checklist action to the synchronization database 480. For example, the synchronization database 480 may be implemented as temporary storage to facilitate conflict checking operations between updates, validations, etc., of checklist actions that are made in close temporal proximity to each other.

During a thirteenth example operation 526, the synchronization manager 430 causes the synchronization database 480 to push the validation of the checklist action to the checklist stored in the flight project database 470. In some examples, the synchronization manager 430 may store an association of an identifier of the validating entity (e.g., the control client device 404, the control operator, etc.) and the validation of the checklist action.

During a fourteenth example operation 528, the flight project manager 420 identifies that the validation of the checklist action has occurred and retrieves the validation from the flight project database 470. During a fifteenth example operation 530, the flight project manager 420 pushes the validation of the checklist action to a client subscribers, such as the field client device 406. For example, the flight project manager 420 may push a checklist item update message to the second client application 405B to notify the first aircraft personnel 124 that the completion of the checklist action has been validated. In some such examples, the second client application 405B may display an alert on the GUI of the second client application 405B to indicate that the validation of the checklist action has been conducted or executed by the control operator utilizing the control client device 404.

Figure 6:
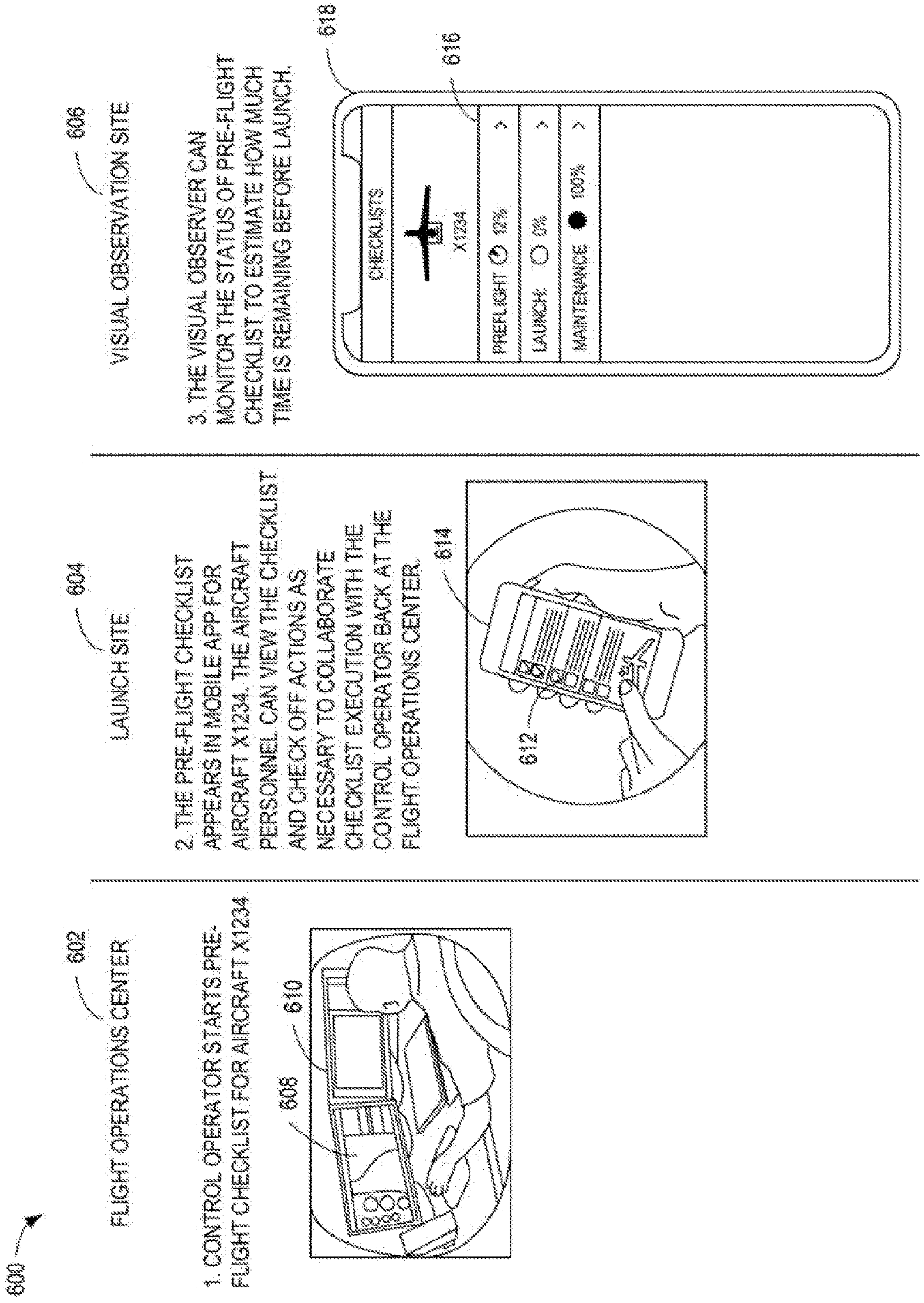
FIG. 6 is a third example flight management workflow to facilitate the flight of the example aircraft of FIG. 1.

FIG. 6 is a third example flight management workflow 600 to facilitate the flight of the aircraft 120 of FIG. 1. The third example flight management workflow 600 of FIG. 6 includes a first example operation 602, a second example operation 604, and a third example operation 606. In this example, the first operation 602 may be executed by a control operator at a flight operations center. For example, the control operator may control a first example client application 608 on a first example client device 610. For example, the first client application 608 may be an example implementation of the client application 118 of FIG. 1. In some examples, the first client device 610 may be an example implementation of the first client device 104 of FIG. 1.

In this example, the second operation 604 may be executed by a first aircraft personnel, such as the first aircraft personnel 124 of FIG. 1, at a launch site, such as the launch location 130 of FIG. 1. For example, the first aircraft personnel may control a second example client application 612 on a second example client device 614. For example, the second client application 612 may be an example implementation of the client application 118 of FIG. 1. In some examples, the second client device 614 may be an example implementation of the third client device 108 of FIG. 1.

In this example, the third operation 606 may be executed by a second aircraft personnel, such as the second aircraft personnel 126 of FIG. 1, at a visual observation site, such as the visual observation location 132 of FIG. 1. For example, the second aircraft personnel may control a third example client application 616 on a third example client device 618. For example, the third client application 616 may be an example implementation of the client application 118 of FIG. 1. In some examples, the third client device 618 may be an example implementation of the third client device 108 of FIG. 1.

During the first operation 602, the control operator starts a pre-flight checklist for an aircraft having an identifier of X1234. During the second operation 604, the first aircraft personnel launches the pre-flight checklist in a mobile application for the aircraft X1234. For example, the mobile application may be an example implementation of the client application 118 of FIG. 1. During the second operation 604, the first aircraft personnel 124 may view the pre-flight checklist and check off actions as necessary to collaborate checklist execution with the control operator back at the flight operations center. During the third operation 606, the second aircraft personnel may monitor the status of the pre-flight checklist to estimate how much time is remaining before launch.

Figure 7A:
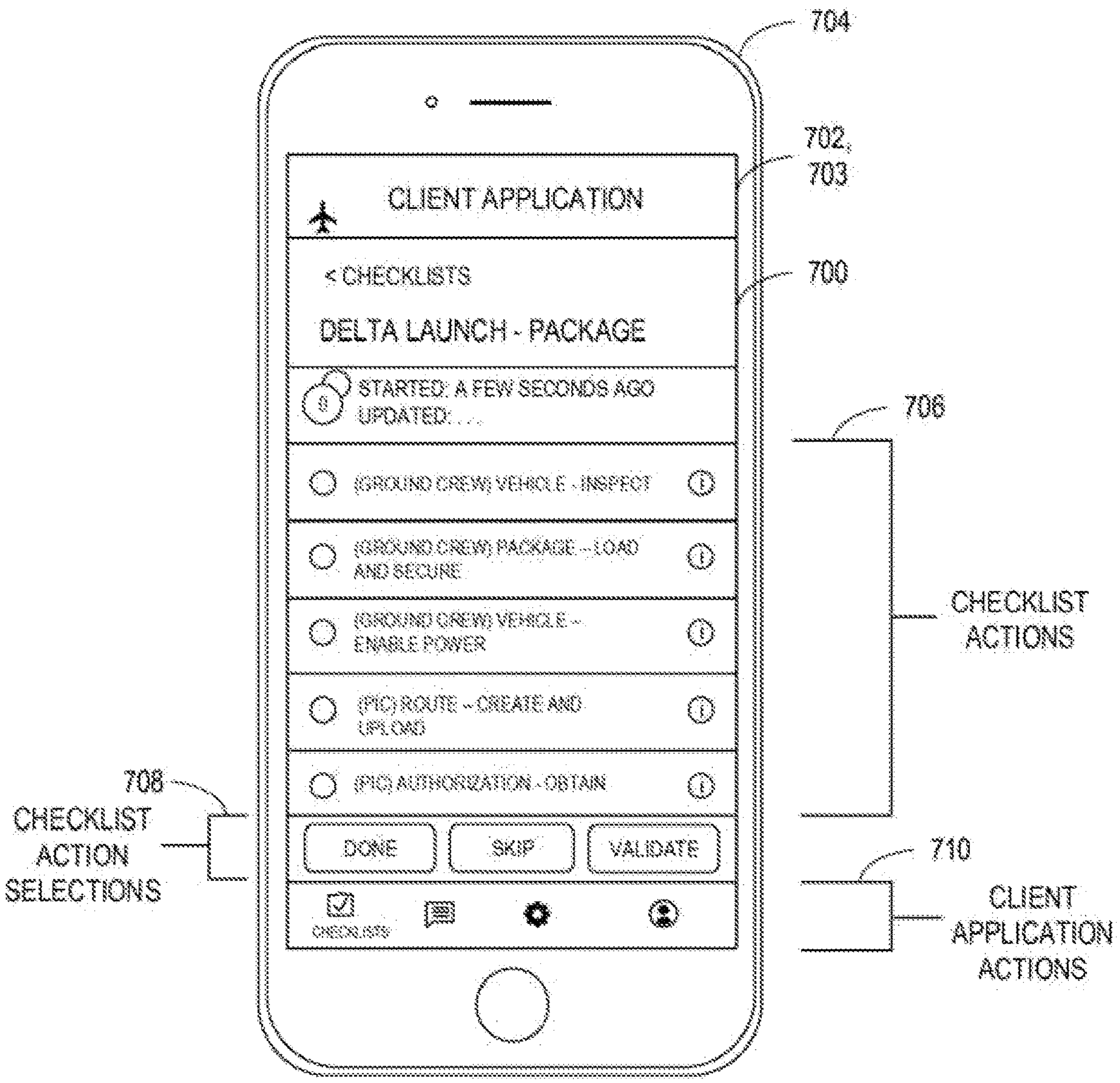
FIGS. 7A-7C depict example implementations of an example collaborative aircraft checklist.

FIG. 7A depicts an example implementation of an example checklist 700 included in an example client application 702 operating on an example client device 704. In this example, the client application 702 may launch an example user interface 703 including the checklist 700. For example, the checklist 700 may be a collaborative aircraft checklist associated with the aircraft 120 of FIG. 1. In some examples, the client application 702 may implement the client application 118 of FIG. 1, the client application 405A, 405B of FIGS. 4 and/or 5, the first client application 608 of FIG. 6, the second client application 612 of FIG. 6, and/or the third client application 616 of FIG. 6. In some examples, the client device 704 may implement one(s) of the client devices 104, 106, 108, 110, 112, 114, 116 of FIG. 1, the client device 200 of FIG. 2, the control client device 404 of FIGS. 4 and/or 5, the field client device 406 of FIGS. 4 and/or 5, the first client device 610 of FIG. 6, the second client device 614 of FIG. 6, the third client device 618 of FIG. 6.

In the illustrated example of FIG. 7A, the checklist 700 includes a plurality of example checklist actions 706. For example, the checklist actions 706 may be executed by an aircraft personnel, such as one of the aircraft personnel 124, 126, 128 of FIG. 1. In some such examples, the first aircraft personnel 124 may execute a first checklist action of inspecting a vehicle, such as the aircraft 120 of FIG. 1, a second checklist action of loading and securing the vehicle, a third checklist action of enabling power of the vehicle, etc.

In the illustrated example of FIG. 7A, the checklist 700 includes example action selections (e.g., checklist action selections) 708 including a DONE, SKIP, and VALIDATE action. Additionally or alternatively, fewer, more and/or different types of checklist actions may be implemented by the checklist 700. For example, the action selections 708 may additionally or alternatively include a CLEAR action. In some such examples, the CLEAR action may be selected to clear a status of a checklist action. For example, if a checklist action has previously been marked as DONE or SKIPPED, the CLEAR action may be selected to remove that status to cause the checklist status to be appear unmarked (e.g., not marked as DONE or SKIPPED) in the client application 702. In some such examples, the aircraft personnel may have prematurely marked a checklist action as DONE or SKIPPED and may select the CLEAR action to indicate that the checklist action is not yet DONE or SKIPPED.

In the illustrated example of FIG. 7A, the aircraft personnel may select a checklist action and the DONE action when the checklist action is completed. In this example, the aircraft personnel may select a checklist action and the SKIP action when the checklist action is to be skipped. In this example, the aircraft personnel may select a checklist action and the VALIDATE action when the checklist action is executed by a different aircraft personnel (e.g., a control operator, a visual observer, etc.).

In the illustrated example of FIG. 7A, the client application 702 includes example client application actions 710 including a checklist action, a chat action, a settings action, and a profile action. For example, the aircraft personnel may select the checklists icon to view a different checklist than the checklist 700 of FIG. 7A. In this example, the aircraft personnel may select the chat icon to message another aircraft personnel associated with the flight project. In this example, the aircraft personnel may select the gear icon to access settings of the checklist 700 and/or, more generally, the client application 702. For example, the aircraft personnel may select the gear icon to modify the checklist 700 by editing one or more of the checklist actions 706 or settings, parameters, configurations, etc., thereof. In this example, the aircraft personnel may select the profile icon to access profile settings associated with the aircraft personnel and/or the client device 704. For example, the aircraft personnel may select the profile icon to change an account password, to login with a different username or other login credential(s), etc.

Figure 7C:
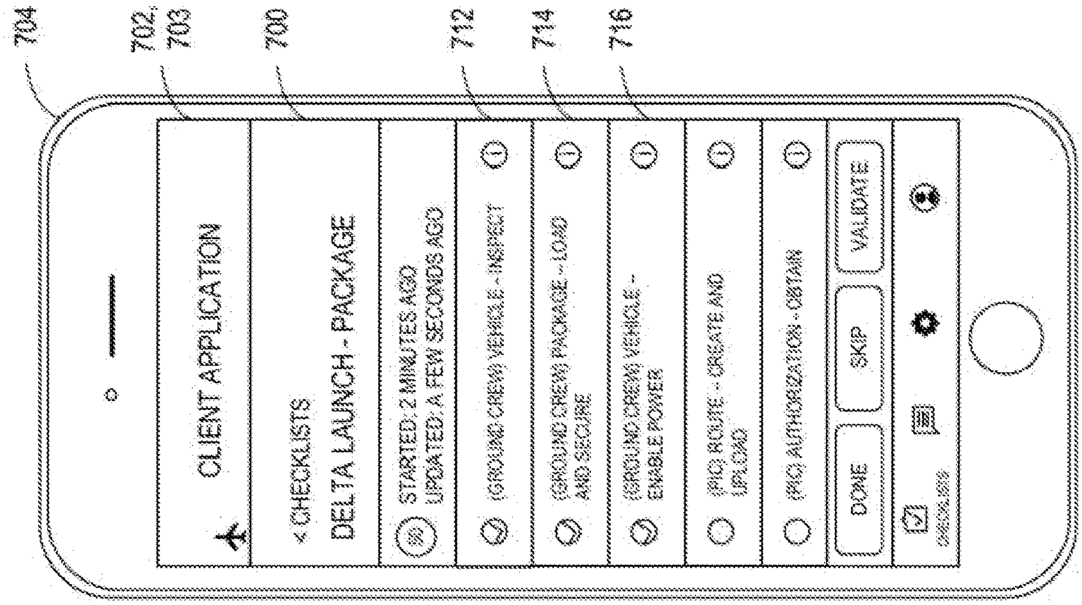
Figure 7B:
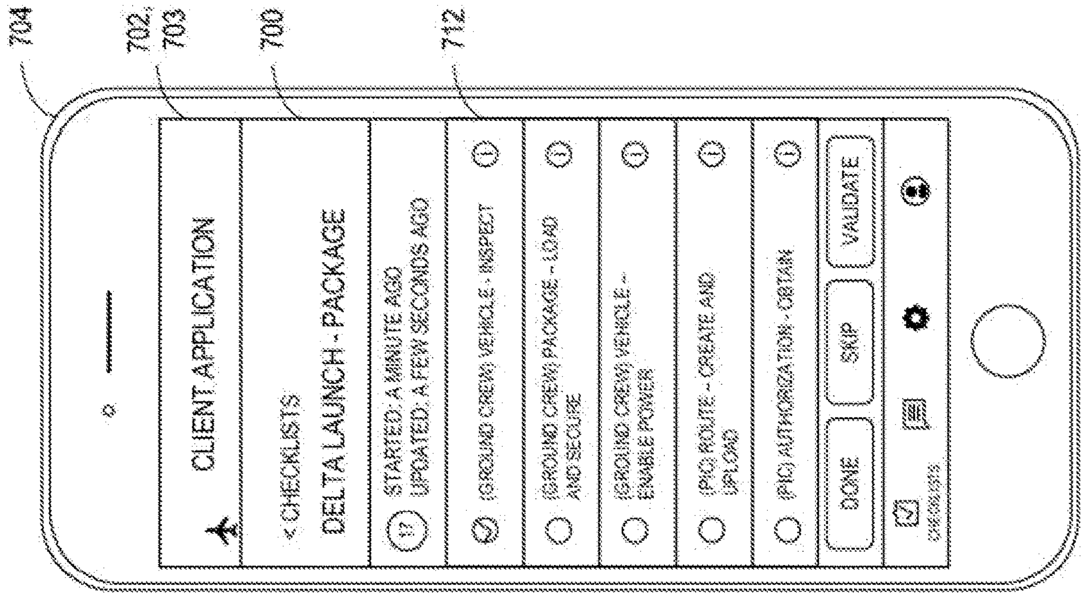

FIG. 7B depicts the checklist 700, the client application 702, and the client device 704 of FIG. 7A with a first example checklist action 712 of the checklist actions 706 marked as complete. Advantageously, in some examples, in response to the aircraft personnel marking and/or otherwise causing the first checklist action 712 to be indicated as complete, the client application 702 may push an update (e.g., a checklist update, a checklist update event, etc.) to the central server 102 of FIG. 1, which, in turn, may push the update to one(s) of the client devices 104, 106, 108, 110, 112, 114, 116 to update the one(s) of the client devices 104, 106, 108, 110, 112, 114, 116 in substantially real time.

FIG. 7C depicts the checklist 700, the client application 702, and the client device 704 of FIG. 7A with the first checklist action 712, a second example checklist action 714, and a third example checklist action 716 of the checklist actions 706 marked as complete. Advantageously, in some examples, in response to the aircraft personnel marking and/or otherwise causing the first checklist action 712, the second checklist action 714, and/or the third checklist action 716 to be indicated as complete, the client application 702 may push one or more updates (e.g., checklist update(s), checklist update event(s), etc.) to the central server 102 of FIG. 1, which, in turn, may push the one or more updates to one(s) of the client devices 104, 106, 108, 110, 112, 114, 116 to update the one(s) of the client devices 104, 106, 108, 110, 112, 114, 116 in substantially real time.

Figure 8:
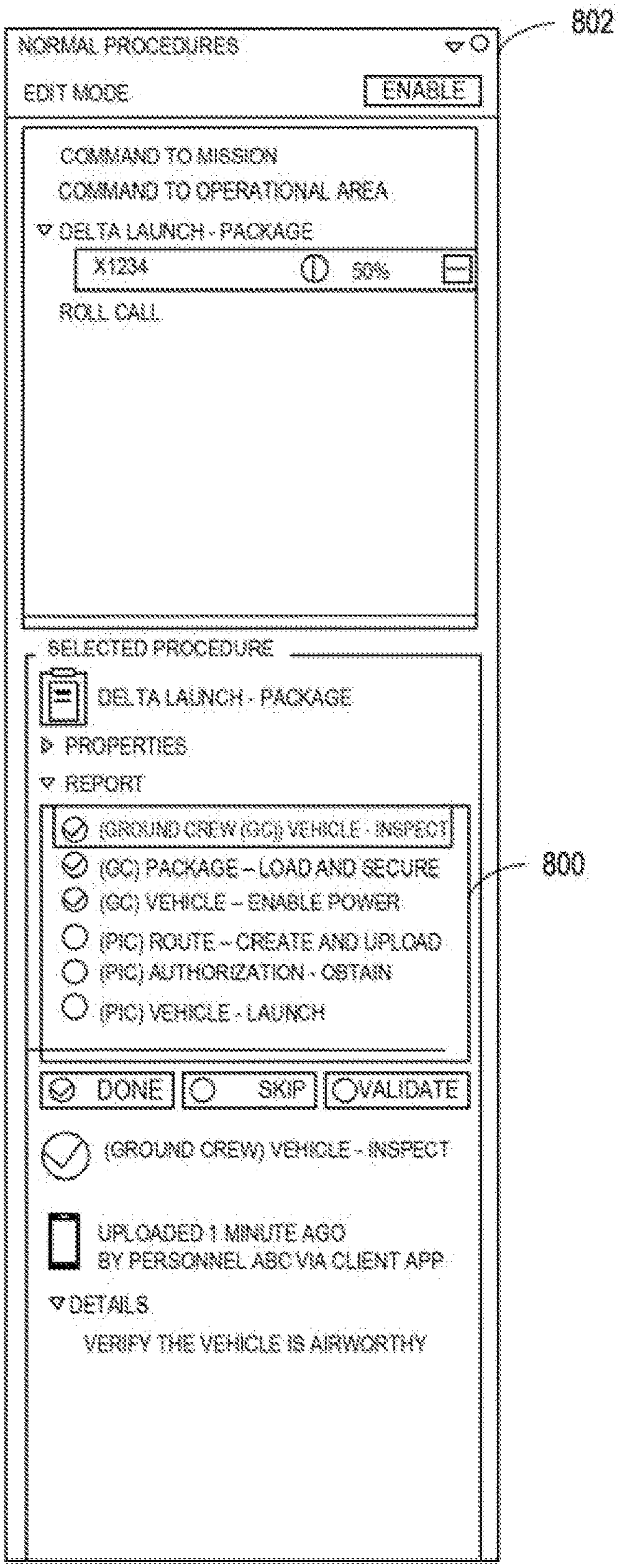
FIG. 8 depicts another example implementation of an example collaborative aircraft checklist.

FIG. 8 depicts another example implementation of an example collaborative aircraft checklist 800 implemented by an example client application 802. For example, the checklist 800 may be a collaborative aircraft checklist associated with the aircraft 120 of FIG. 1. In some such examples, the checklist 800 may be implemented by the checklist 700 of FIGS. 7A-7C. In some examples, the client application 802 may implement the client application 118 of FIG. 1, the client application 405A, 405B of FIGS. 4 and/or 5, the first client application 608 of FIG. 6, the second client application 612 of FIG. 6, the third client application 616 of FIG. 6, and/or the client application 702 of FIGS. 7A-7C.

In the illustrated example of FIG. 8, the client application 802 is implementing a settings screen. For example, an aircraft personnel may launch the display of FIG. 8 in response to selecting the gear icon of FIGS. 7A-7C. In this example, the aircraft personnel may select a flight project (DELTA LAUNCH-PACKAGE) and view a status of the flight project, which is depicted in FIG. 8 as 50% complete. In this example, the aircraft personnel may edit and/or otherwise modify one or more checklist actions of the checklist 800 in response to the edit mode being enabled.

Figure 9:
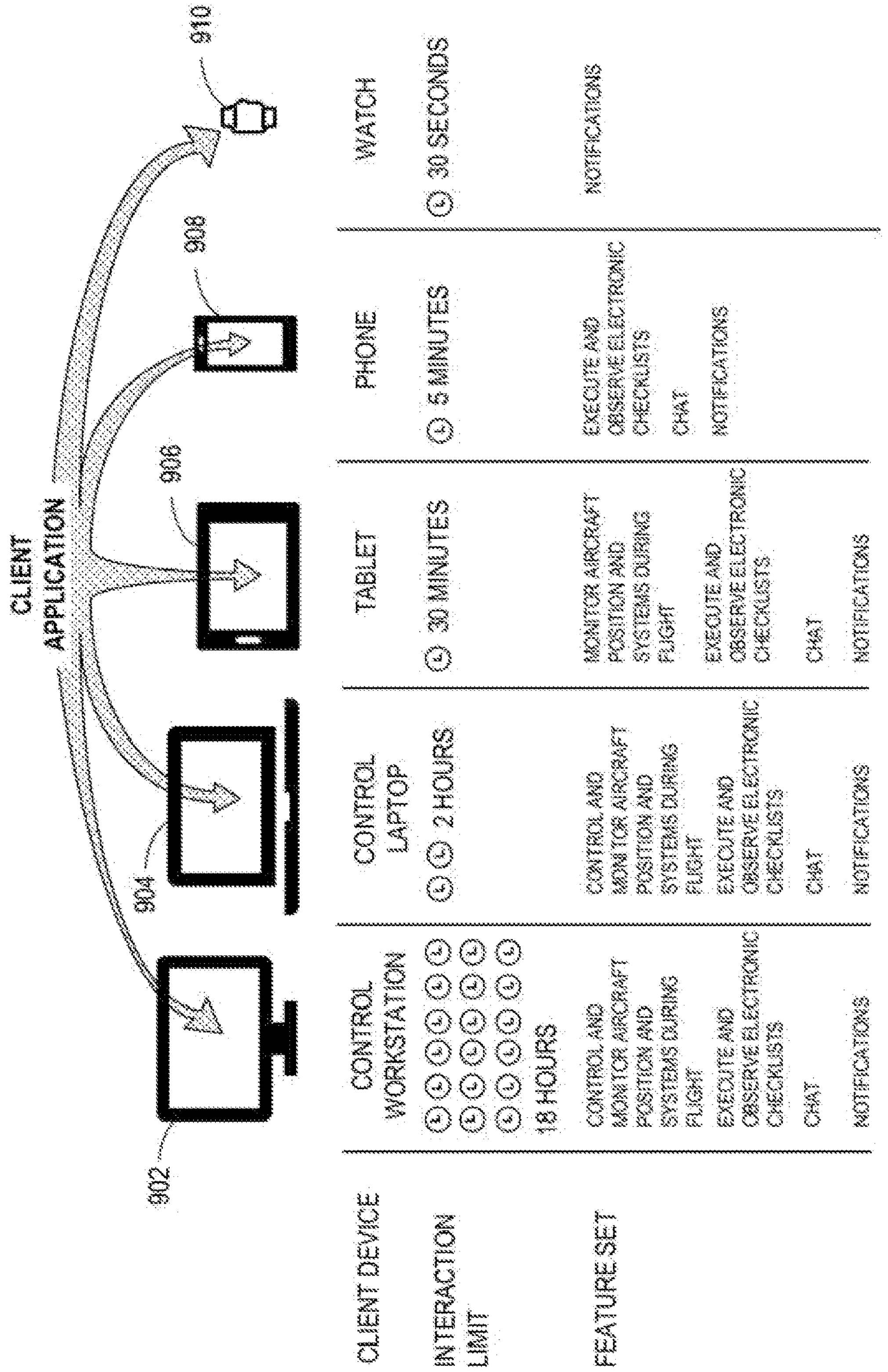
FIG. 9 depicts example implementations of the client devices of FIG. 1.

FIG. 9 depicts example implementations of example client devices 902, 904, 906, 908, 910 including a first example client device 902, a second example client device 904, a third example client device 906, a fourth example client device 908, and a fifth example client device 910. In some examples, the first client device 902 may implement the first client device 104 of FIG. 1. In some examples, the second client device 904 may implement the fourth client device 110 of FIG. 1. In some examples, the third client device 906 may implement the second client device 106 of FIG. 1. In some examples, the fourth client device 908 may implement the third client device 108 of FIG. 1. In some examples, the fifth client device 910 may implement the fifth client device 112 of FIG. 1.

In the illustrated example of FIG. 9, the different client devices 902, 904, 906, 908, 910 may have different interaction limits. For example, an aircraft personnel may interact with the first client device 902 for a total time period of 18 hours because the aircraft personnel may be a control operator that is coordinating executing of an entire flight project, which may span a day or more. In this example, an aircraft personnel may interact with the fifth client device 910 over a total time period of 30 seconds because the aircraft personnel is a visual observer that checks the fifth client device 910 in response to a notification of a checklist update.

In the illustrated example of FIG. 9, the different client devices 902, 904, 906, 908, 910 may have different feature sets. For example, the first client device 902 may have access to a first feature set including first features such as controlling and monitoring aircraft position and systems during flight, executing and observing electronic checklists, chatting with aircraft personnel, and receiving notifications of aircraft project updates. In this example, the fourth client device 908 may have access to a second feature set including second features such as executing and observing electronic checklists, chatting with aircraft personnel, and receiving notifications of aircraft project updates. In this example, the number of the second features is less than the number of the first features. In this example, the number of features that an aircraft personnel has access to may be based on a type of the client devices 902, 904, 906, 908, 910.

Flowcharts representative of example hardware logic, machine readable instructions, hardware implemented state machines, and/or any combination thereof for implementing the example client device 200 of FIG. 2 and/or the example central server 300 of FIG. 3 are shown in FIGS. 10-13. The machine readable instructions may be one or more executable programs or portion(s) of an executable program for execution by a computer processor and/or processor circuitry, such as the processor 1412 shown in the example processor platform 1400 discussed below in connection with FIG. 14 and/or the processor 1512 shown in the example processor platform 1500 discussed below in connection with FIG. 15. The program may be embodied in software stored on a non-transitory computer readable storage medium such as a CD-ROM, a floppy disk, a hard drive, a DVD, a Blu-ray disk, or a memory associated with the processor 1412 of FIG. 14 and/or the processor 1512 of FIG. 15, but the entire program and/or parts thereof could alternatively be executed by a device other than the processor 1412 of FIG. 14 and/or the processor 1512 of FIG. 15 and/or embodied in firmware or dedicated hardware. Further, although the example program is described with reference to the flowcharts illustrated in FIG. 10-13, many other methods of implementing the example client device 200 and/or the central server 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HTML, SQL, Swift, etc.

As mentioned above, the example processes of FIGS. 10-13 may be implemented using executable instructions (e.g., computer and/or machine readable instructions) stored on a non-transitory computer and/or machine readable medium such as an HDD, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 10:
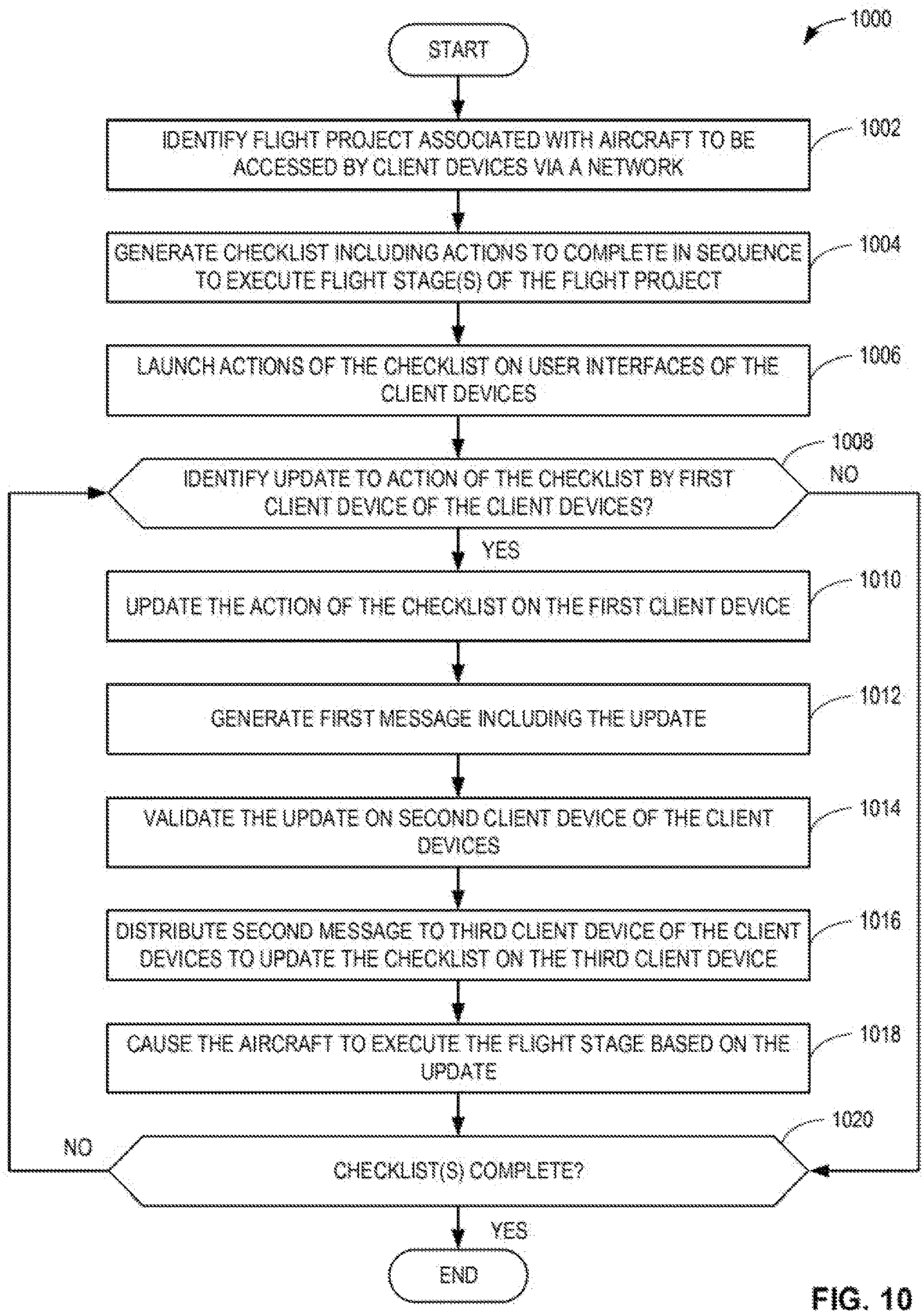
FIG. 10 is a flowchart representative of example machine readable instructions that may be executed to implement one(s) of the example client devices of FIGS. 1 and/or 2 to facilitate flight of the example aircraft of FIG. 1 utilizing collaborative aircraft checklists.

FIG. 10 is a flowchart representative of example machine readable instructions 1000 that may be executed to implement one(s) of the client devices 104, 106, 108, 110, 112, 114, 116 of FIG. 1 and/or the client device 200 of FIG. 2 to facilitate flight of the aircraft 120 of FIG. 1 utilizing collaborative aircraft checklists. The machine readable instructions 1000 of FIG. 10 begin at block 1002 at which the client device 200 identifies a flight project associated with the aircraft 120 to be accessed by client devices via a network. For example, the flight project handler 230 (FIG. 2) may identify a flight project associated with the aircraft 120, and the flight project to be accessed by one(s) of the client devices 104, 106, 108, 110, 112, 114, 116 of FIG. 1 via the network 122 of FIG. 1.

At block 1004, the client device 200 generates a checklist including actions to complete in sequence to execute flight stage(s) of the flight project. For example, the checklist handler 240 (FIG. 2) may generate the checklist 700 of FIGS. 7A-7C, which may include the checklist actions 706 of FIGS. 7A-7C to execute a flight stage, such as a pre-flight stage, an in-flight stage, etc.

At block 1006, the client device 200 launches actions of the checklist on user interfaces of the client devices. For example, the user interface 220 (FIG. 2) may launch a user interface on respective one(s) of the client devices 104, 106, 108, 110, 112, 114, 116 of FIG. 1. In some such examples, the user interface 220 may launch the user interface based on a type of the client devices 104, 106, 108, 110, 112, 114, 116 of FIG. 1. In some such examples, the user interface 220 may launch the checklist actions 706 of FIGS. 7A-7C based on at least one of the device type, a role of an aircraft personnel associated with the device type, the flight stage to be implemented, etc.

At block 1008, the client device 200 determines whether an update to an action of the checklist by a first client device of the client devices is identified. For example, the checklist handler 240 of the sixth client device 114 of FIG. 1 may identify that the first checklist action 712 of FIGS. 7B-7C has been updated. In some such examples, the checklist handler 240 may identify that the first aircraft personnel 124 updated the first checklist action 712 by selecting the first checklist action 712 and selecting DONE.

If, at block 1008, the client device 200 determines that an update to an action of the checklist by the first client device of the client devices is not identified, control proceeds to block 1020 to determine whether the checklist is complete. If, at block 1008, the client device 200 determines that an update to an action of the checklist by the first client device of the client devices is identified, then, at block 1010, the client device 200 updates the action of the checklist on the first client device. For example, the checklist handler 240 may update an icon next to the first checklist action 712 to indicate that the first checklist action 712 is complete, such as by inserting a checkmark icon or other affirmative icon indicative of completion next to the first checklist action 712.

At block 1012, the client device 200 generates a first message including the update. For example, the message handler 250 (FIG. 2) may transmit a message (e.g., an HTTP POST message) including data associated with the update to the first checklist action 712 to the central server 102.

At block 1014, the client device 200 validates the update on a second client device of the client devices. For example, the validation handler 260 (FIG. 2) of the first client device 104 of FIG. 1 may receive the update from the central server 102. In some such examples, a control operator may validate the update on the first client device 104.

At block 1016, the client device 200 distributes a second message to a third client device of the client devices to update the checklist on the third client device. For example, the message handler 250 of the first client device 104 may transmit a message to the central server 102, and the message may include data associated with the validation. In some such examples, the central server 102 may distribute a message to the sixth client device 114 and/or other client device(s) 104, 106, 108, 110, 112, 114, 116, and the message may include the data associated with the validation. In some such examples, the checklist handler 240 of the receiving one(s) of the client device(s) 104, 106, 108, 110, 112, 114, 116 may update the checklist on the respective one(s) of the client device(s) 104, 106, 108, 110, 112, 114, 116 based on the validation.

At block 1018, the client device 200 causes the aircraft to execute the flight stage based on the update. For example, the aircraft controller 270 (FIG. 2) may instruct the aircraft 120 to takeoff.

At block 1020, the client device 200 determines whether checklist(s) are complete. For example, the checklist handler 240 may determine whether the checklist 700 of FIGS. 7A-7C is complete. If, at block 1020, the client device 200 determines that the checklist(s) is/are not complete, control returns to block 1008, otherwise the machine readable instructions 1000 of FIG. 10 conclude.

Figure 11:
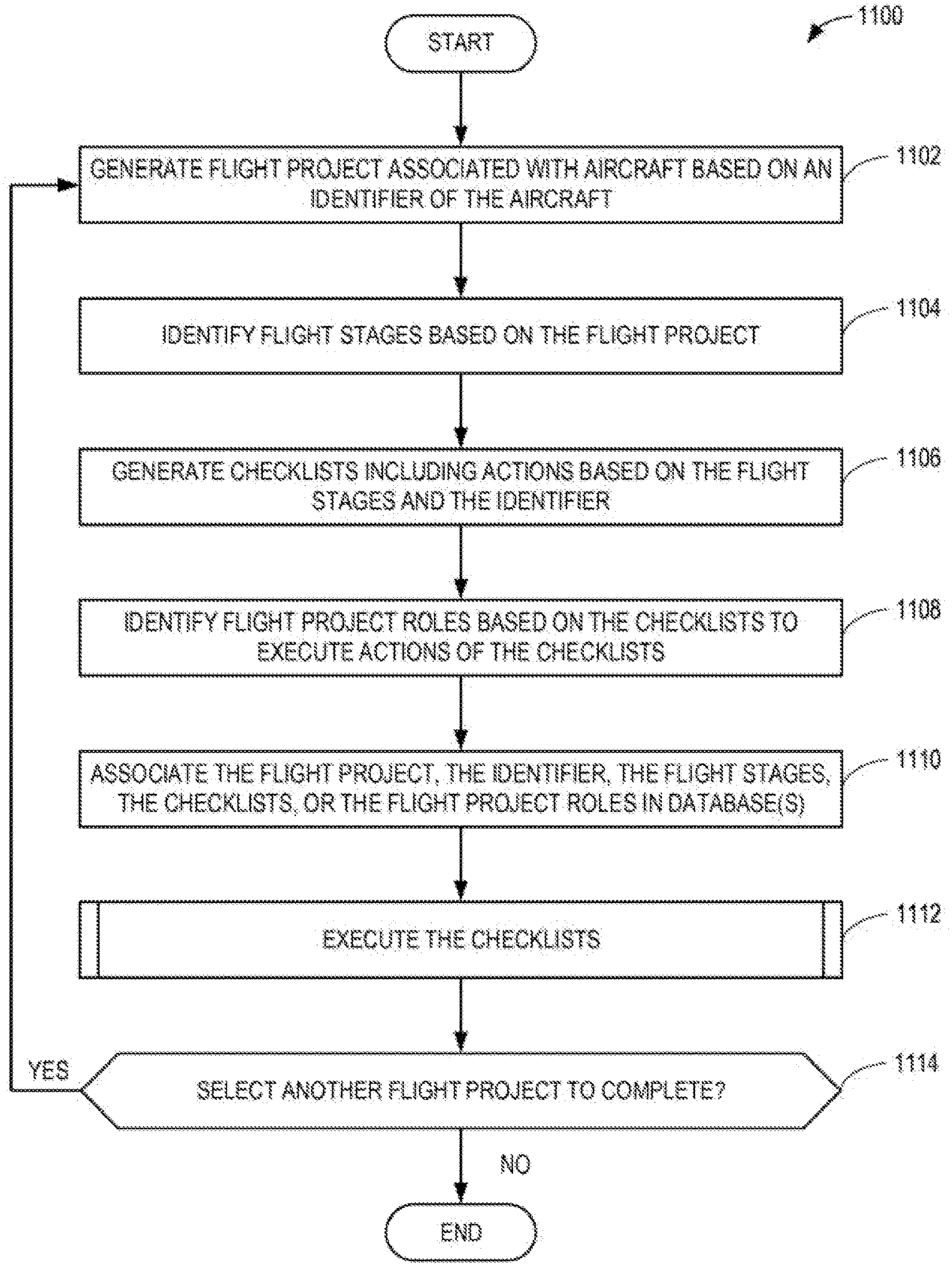
FIG. 11 is a flowchart representative of example machine readable instructions that may be executed to implement one(s) of the example client devices of FIGS. 1 and/or 2 to generate a collaborative aircraft checklist.

FIG. 11 is a flowchart representative of example machine readable instructions that may be executed to implement one(s) of the client devices 104, 106, 108, 110, 112, 114, 116 of FIG. 1 and/or the client device 200 of FIG. 2 to generate a collaborative aircraft checklist. The machine readable instructions 1100 of FIG. 11 begin at block 1102 at which the client device 200 generates a flight project associated with an aircraft based on an identifier of the aircraft. For example, the flight project handler 230 (FIG. 2) may generate a flight project associated with the aircraft 120 based on a tail number of the aircraft 120.

At block 1104, the client device 200 identifies flight stages based on the flight project. For example, the flight project handler 230 may identify a pre-flight stage, an in-flight stage, and a post-flight stage based on the flight project to implement a flight operation of the aircraft 120.

At block 1106, the client device 200 generates checklists including actions based on the flight stages and the identifier. For example, the checklist handler 240 (FIG. 2) may generate the checklist 700 of FIG. 7 of FIGS. 7A-7C based on a flight stage and a tail number of the aircraft 120.

At block 1108, the client device 200 identifies flight project roles based on the checklists to execute actions of the checklist. For example, the flight project handler 230 may identify a flight project role of a control operator, a ground crew operator, a visual observer, etc., based on the checklists to execute the checklist actions 706 of FIG. 7A.

At block 1110, the client device 200 associate the flight project, the identifier, the flight stages, the checklists, or the flight project roles in database(s). For example, the flight project handler 230 may generate and/or cause association(s) of at least one of the flight project, the identifier, the flight stages, the checklists, or the flight project roles to be stored in the flight project database 370 (FIG. 3).

At block 1112, the client device 200 executes the checklists. For example, the checklist handler 240 may execute the checklist actions 706. An example process that may be executed to implement block 1112 is described below in connection with FIG. 12.

At block 1114, the client device 200 determines whether to select another flight project to complete. For example, the flight project handler 230 may determine whether to select another flight project associated with the aircraft 120 or a different aircraft to complete. If, at block 1114, the flight project handler 230 determines to select another flight project to complete, control returns to block 1102, otherwise the example machine readable instructions 1100 of FIG. 11 conclude.

Figure 12:
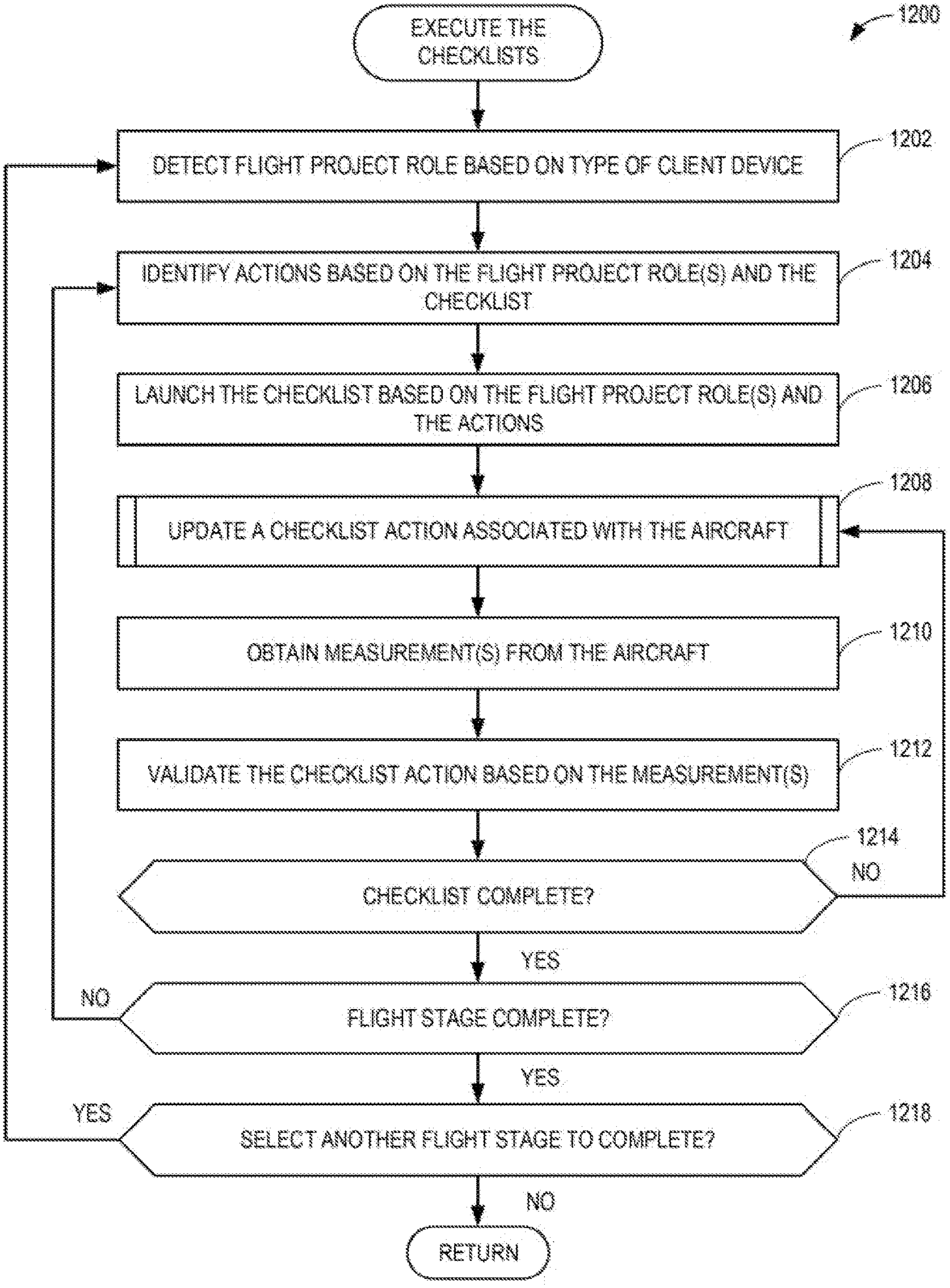
FIG. 12 is a flowchart representative of example machine readable instructions that may be executed to implement one(s) of the example client devices of FIGS. 1 and/or 2 to execute a collaborative aircraft checklist.

FIG. 12 is a flowchart representative of example machine readable instructions that may be executed to implement one(s) of the client devices 104, 106, 108, 110, 112, 114, 116 of FIG. 1 and/or the client device 200 of FIG. 2 to execute a collaborative aircraft checklist. The machine readable instructions 1200 of FIG. 12 may be executed to implement block 1112 of FIG. 11. The machine readable instructions 1200 of FIG. 12 begin at block 1202, at which the client device 200 detects a flight project role based on a type of a client device. For example, the flight project handler 230 (FIG. 2) may detect that the first aircraft personnel 124 of FIG. 1 is a ground crew operator or aircraft personnel based on the type of the sixth client device 114 of FIG. 1.

At block 1204, the client device 200 identifies actions based on the flight project role(s) and the checklist. For example, the flight project handler 230 may identify the checklist actions 706 of FIG. 7A of the checklist 700 of FIGS. 7A-7C in response to detecting that the flight project role associated with the sixth client device 114 is a ground crew operator or aircraft personnel.

At block 1206, the client device 200 launches the checklist based on the flight project role(s) and the actions. For example, the user interface 220 (FIG. 2) may launch the checklist 700 in the client application 702 based on the flight project role associated with the client device 704 and the checklist actions 706.

At block 1208, the client device 200 updates a checklist action associated with the aircraft. For example, the first aircraft personnel 124 may update the first checklist action 712 of FIGS. 7B-7C to change the status of the first checklist action 712 from not complete to complete. An example process that may be executed to implement block 1208 is described below in connection with FIG. 13.

At block 1210, the client device 200 obtains measurement (s) from the aircraft. For example, the aircraft controller 270

(FIG. 2) may request aircraft measurements (e.g., an airspeed, an altitude, a GPS position, etc.) from the aircraft measurement database 390 (FIG. 3), and/or, more generally, from the central server 102 of FIG. 1 and/or the central server 300 of FIG. 3, that are associated with the aircraft 120 of FIG. 1.

At block 1212, the client device 200 validates the checklist action based on the measurement(s). For example, the validation handler 260 (FIG. 2) of the first client device 104 may validate the first checklist action 712 completed by the first aircraft personnel 124.

At block 1214, the client device 200 determines whether the checklist is complete. For example, the checklist handler 240 may determine whether all of the checklist actions 706 are complete. If, at block 1214, the client device 200 determines that the checklist is not complete, control returns to block 1208, otherwise control proceeds to block 1216 to determine whether the flight stage is complete. For example, the checklist handler 240 may determine whether there is another checklist not yet complete to implement the instant or current flight stage being implemented.

If, at block 1216, the client device 200 determines that the flight stage is not complete, control returns to block 1204, otherwise control proceeds to block 1218 to determine whether to select another flight stage to complete. For example, the flight project handler 230 may determine that the in-flight stage of the current or instant flight project being implemented has not yet been completed. If, at block 1218, the client device 200 determines to select another flight stage to complete, control returns to block 1202, otherwise the machine readable instructions 1200 of FIG. 12 conclude. In some examples, in response to determining not to select another flight stage to complete at block 1218, the machine readable instructions 1200 of FIG. 12 may return to block 1114 of the machine readable instructions 1100 of FIG. 11 to determine whether to select another flight project to complete.

Figure 13:
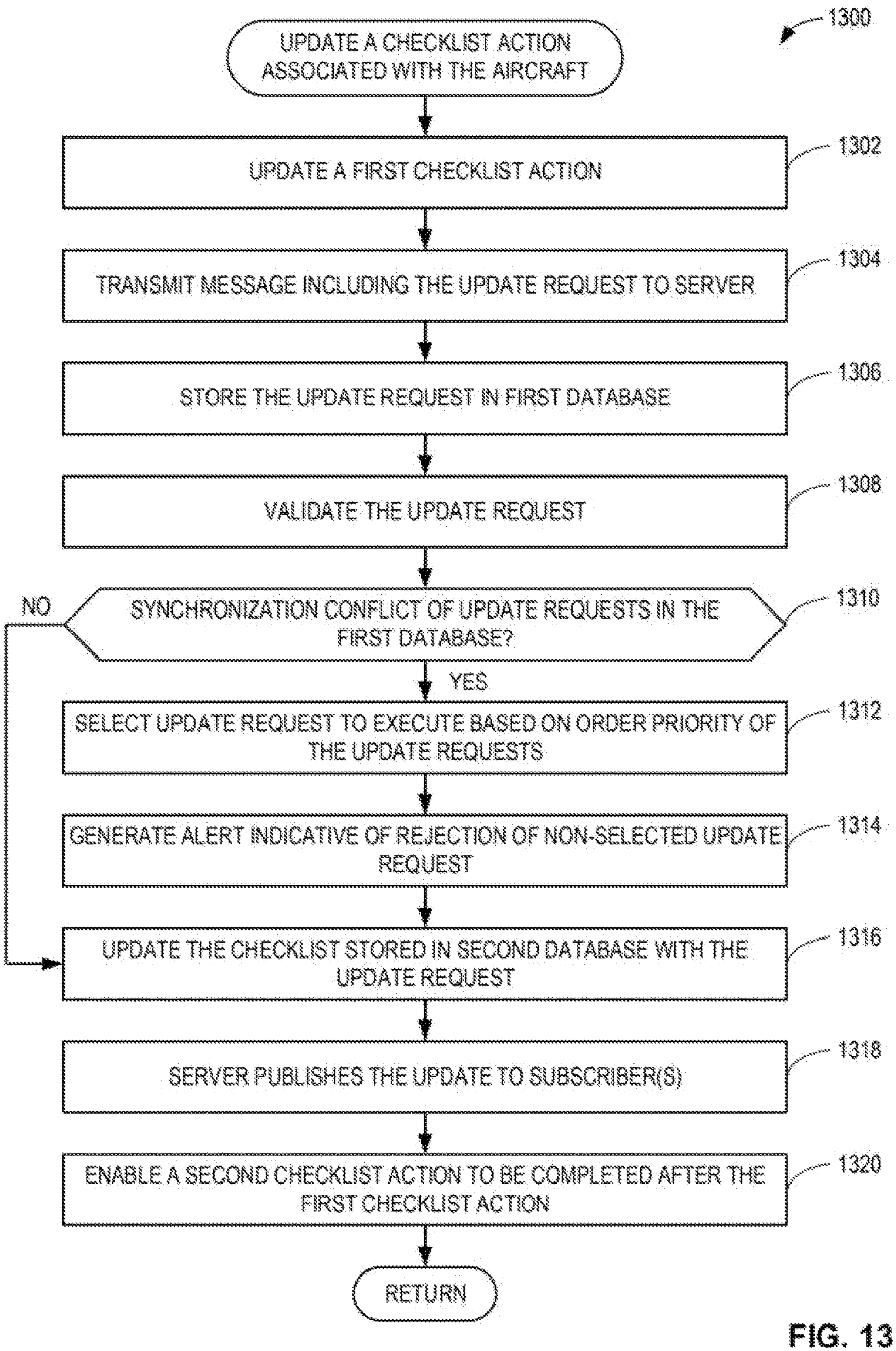
FIG. 13 is a flowchart representative of example machine readable instructions that may be executed to implement one(s) of the example client devices of FIGS. 1 and/or 2 and/or the example central server of FIGS. 1 and/or 3 to update a collaborative checklist action associated with the example aircraft of FIG. 1.

FIG. 13 is a flowchart representative of example machine readable instructions that may be executed to implement one(s) of the client devices 104, 106, 108, 110, 112, 114, 116 of FIG. 1, the client device 200 of FIG. 2, the central server 102 of FIG. 1, and/or the central server 300 of FIG. 3 to update a collaborative checklist action associated with the aircraft 120 of FIG. 1.

The machine readable instructions 1300 of FIG. 13 begin at block 1302, at which the client device 200 updates a first checklist action. For example, the first aircraft personnel 124 may update the first checklist action 712 of the checklist 700 on the client device 704 of FIGS. 7B-7C.

At block 1304, the client device 200 transmits a message including the update request to a server. For example, the message handler 250 (FIG. 2) may generate a message including the update to the first checklist action 712 and transmit the message to the central server 102 of FIG. 1.

At block 1306, the central server 300 stores the update request in a first database. For example, the synchronization manager 330 (FIG. 3) may store the request to update the first checklist action 712 in the synchronization database 380 (FIG. 3).

At block 1308, the central server 300 validates the update request. For example, the checklist manager 340 (FIG. 3) may validate the update request in response to a determination that the request to update the first checklist action 712 comports with the requirements, configurations, settings, etc., of the checklist 700.

At block 1310, the central server 300 determines whether there is a synchronization conflict of update requests in the first database. For example, the synchronization manager 330 may determine that the update request is a first update request to the first checklist action 712 and that a second update request made by the first client device 104 is stored in the synchronization database 380. In some such examples, the synchronization manager 330 may determine that the first and second update requests are in conflict with each other because they are attempting to make different updates to the same checklist action (e.g., a first update to complete the first checklist action 712 and a second update to skip the first checklist action 712).

If, at block 1310, the central server 300 determines that there is not a synchronization conflict of the update requests in the first database, control proceeds to block 1316, otherwise control proceeds to block 1312 to select an update request to execute based on an order priority of the update requests. For example, the synchronization manager 330 may select the first update request to execute in response to a determination that the first update request is stored in the synchronization database 380 prior to the second update request.

At block 1314, the central server 300 generates an alert indicative of a rejection of a non-selected update request. For example, the synchronization manager 330 may generate an alert to notify the first client device 104 that the second update request is rejected. In some such examples, the synchronization manager 330 may generate the alert to include an identifier, a project role, etc., corresponding to the first aircraft personnel 124 whose update request is accepted. In some such examples, the synchronization manager 330 may generate the alert to include the first update request, a timestamp at which the first update request is received, etc., to inform the control operator utilizing the first client device 104 of the acceptance of the first update request.

At block 1316, the central server 300 updates the checklist stored in a second database with the update request. For example, the checklist manager 340 (FIG. 3) may update the checklist 700 stored in the flight project database 370 based on the first update request.

At block 1318, the central server 300 publishes the update to subscriber(s). For example, the subscriber manager 350 (FIG. 3) may identify one(s) of the client devices 104, 106, 108, 110, 112, 114, 116 that subscribe to updates associated with the flight project associated with the aircraft 120. In some such examples, the subscriber manager 350 may publish the first update request to the subscriber(s) by transmitting a message including the first update request to the subscriber(s) to cause the checklist(s) of the subscriber(s) to update based on the first update request.

At block 1320, the client device 200 enables a second checklist action to be completed after the first checklist action. For example, the checklist handler 240 may enable the second checklist action 714 in response to the first checklist action 712 being updated. In response to enabling the second checklist action to be completed after the first checklist action at block 1320, the machine readable instructions 1300 of FIG. 13 conclude. For example, the machine readable instructions 1300 may return to block 1210 of the machine readable instructions 1200 of FIG. 12 to obtain measurement(s) from the aircraft.

Figure 14:
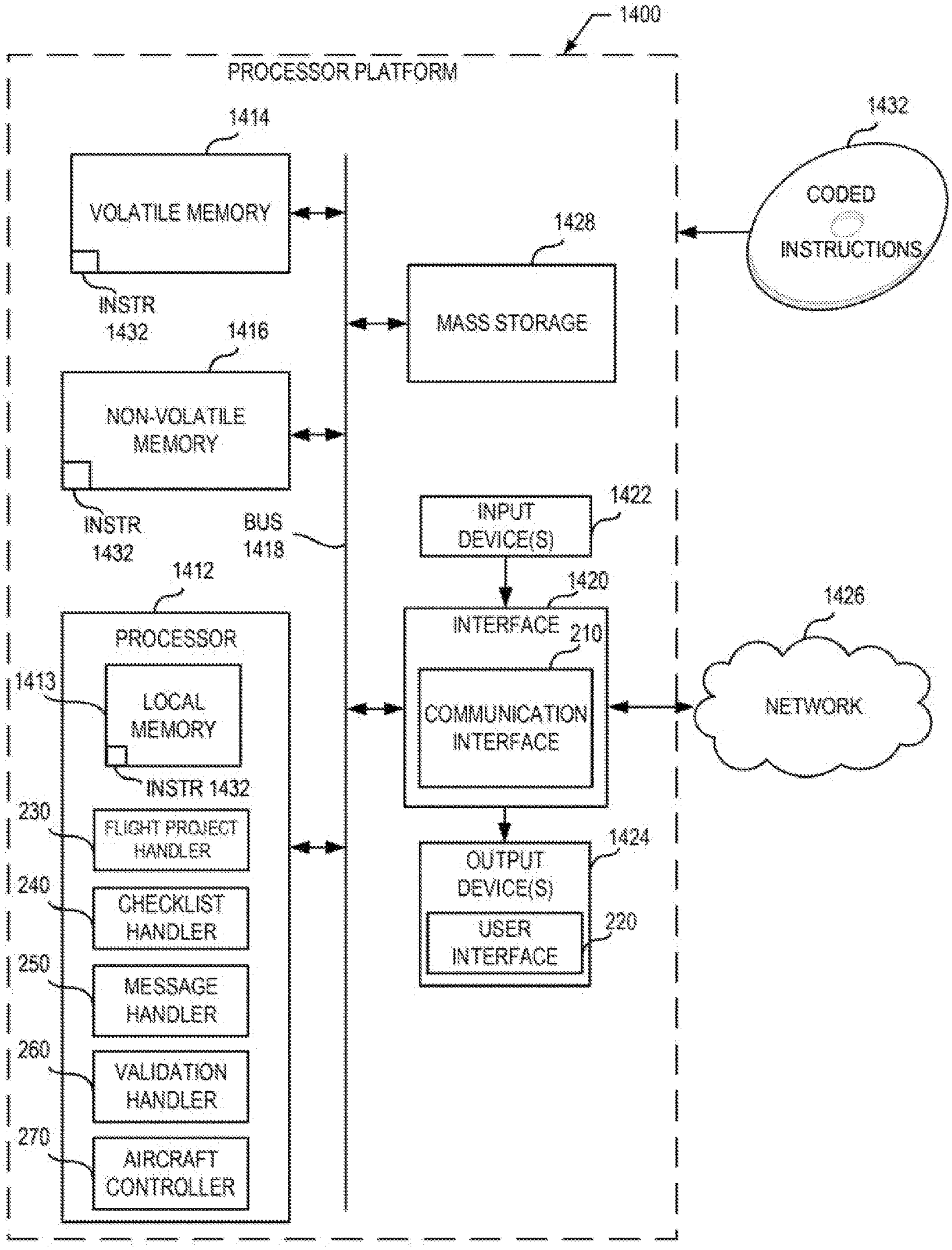
FIG. 14 is a block diagram of an example processing platform structured to execute the example machine readable instructions of FIGS. 10, 11, 12, and/or 13 to implement the one(s) of the example client devices of FIGS. 1 and/or 2.

FIG. 14 is a block diagram of an example processor platform 1400 structured to execute the instructions of FIGS. 10, 11, 12, and/or 13 to implement the example client device 200 of FIG. 2. The processor platform 1400 can be, for example, a server, a personal computer, a workstation, a desktop computer, a laptop computer, a self-learning machine (e.g., a neural network), a mobile device (e.g., a cell phone, a smart phone, a tablet such as an iPad', etc.), a personal digital assistant (PDA), a wearable device (e.g., a headset, a head-mounted display, a smartwatch, etc.), or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1412 implements the example flight project handler 230, the example checklist handler 240, the example message handler 250, the example validation handler 260, and the example aircraft controller 270 of FIG. 2.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by SDRAM, DRAM, RDRAM®, and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer and/or speaker. The interface circuit 1420 of the illustrated example, thus, typically includes a graphics driver card, a graphics driver chip, and/or a graphics driver processor. In this example, the one or more output devices 1424 may implement the example user interface 220 of FIG. 2.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 1420 implements the communication interface 210 of FIG. 2.

The processor platform 1400 of the illustrated example also includes one or more mass storage devices 1428 for storing software and/or data. Examples of such mass storage devices 1428 include floppy disk drives, HDDs, CD drives, Blu-ray disk drives, redundant array of independent disks (RAID) systems, and DVD drives.

The machine executable instructions 1432 of FIGS. 10-13 may be stored in the mass storage device 1428, in the volatile memory 1414, in the non-volatile memory 1416, and/or on a removable non-transitory computer readable storage medium such as a CD or DVD.

Figure 15:
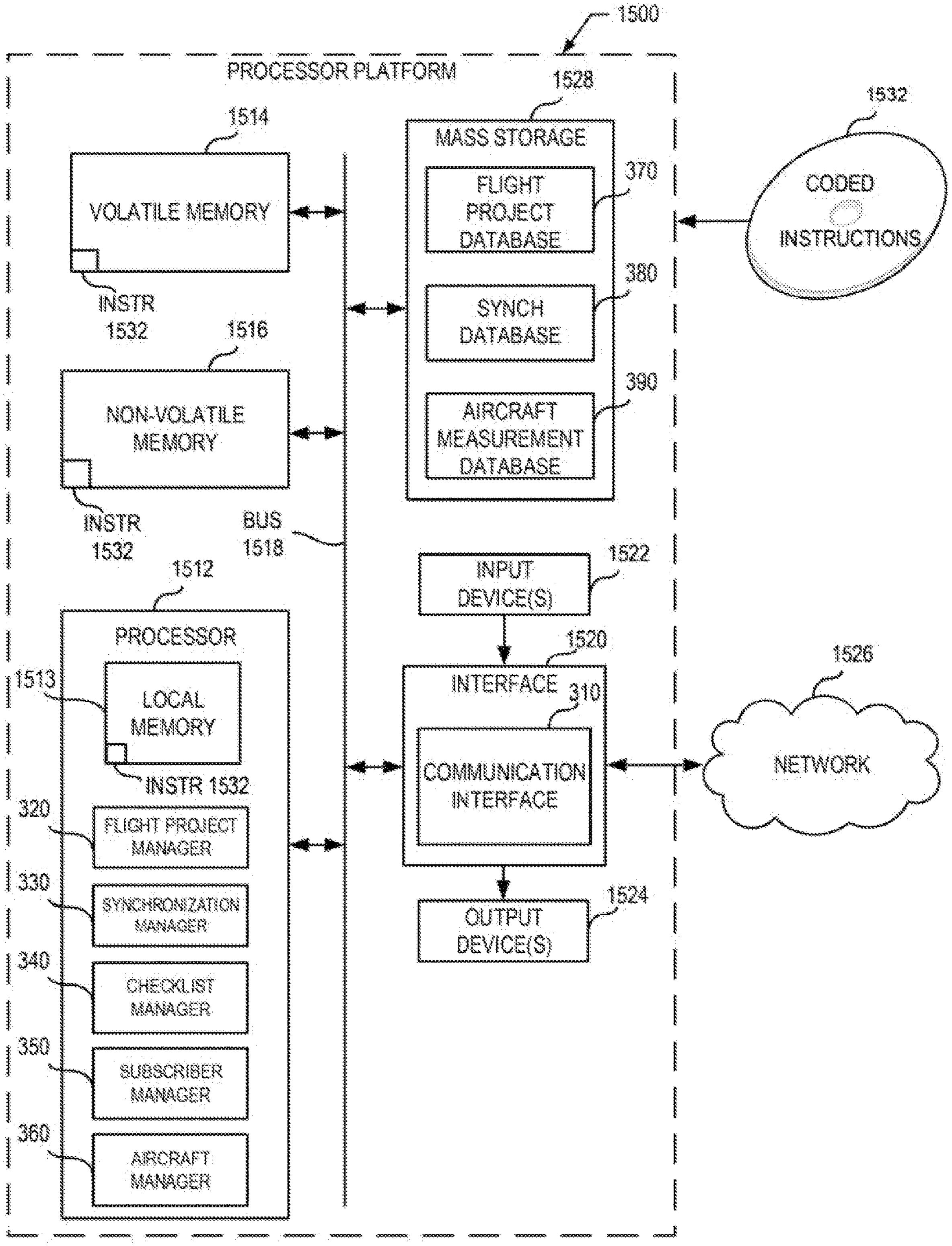
FIG. 15 is a block diagram of an example processing platform structured to execute the example machine readable instructions of FIG. 13 to implement the example central server of FIGS. 1 and/or 3.

FIG. 15 is a block diagram of an example processor platform 1500 structured to execute the instructions of FIG. 13 to implement the example central server 300 of FIG. 3. The processor platform 1500 can be, for example, a server, a workstation, a desktop computer, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1512 implements the example flight project manager 320, the example synchronization manager 330, the example checklist manager 340, the example subscriber manager 350, and the example aircraft manager 360 of FIG. 3.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by SDRAM, DRAM, RDRAM®, and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a USB, a Bluetooth® interface, an NFC interface, and/or a PCI express interface.

In the illustrated example, one or more input devices 1522 are connected to the interface circuit 1520. The input device(s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 1524 are also connected to the interface circuit 1520 of the illustrated example. The output devices 1524 can be implemented, for example, by display devices (e.g., an LED, an OLED, an LCD, a CRT display, an IPS display, a touchscreen, etc.), a tactile output device, a printer and/or speaker. The interface circuit 1520 of the illustrated example, thus, typically includes a graphics driver card, a graphics driver chip, and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 1520 implements the communication interface 310 of FIG. 3.

The processor platform 1500 of the illustrated example also includes one or more mass storage devices 1528 for storing software and/or data. Examples of such mass storage devices 1528 include floppy disk drives, HDDs, CD drives, Blu-ray disk drives, RAID systems, and DVD drives. In this example, the one or more mass storage devices 1528 implement the flight project database 370, the synchronization database 380, and the aircraft measurement database 390 of FIG. 3.

The machine executable instructions 1532 of FIG. 13 may be stored in the mass storage device 1528, in the volatile memory 1514, in the non-volatile memory 1516, and/or on a removable non-transitory computer readable storage medium such as a CD or DVD.

Figure 16:
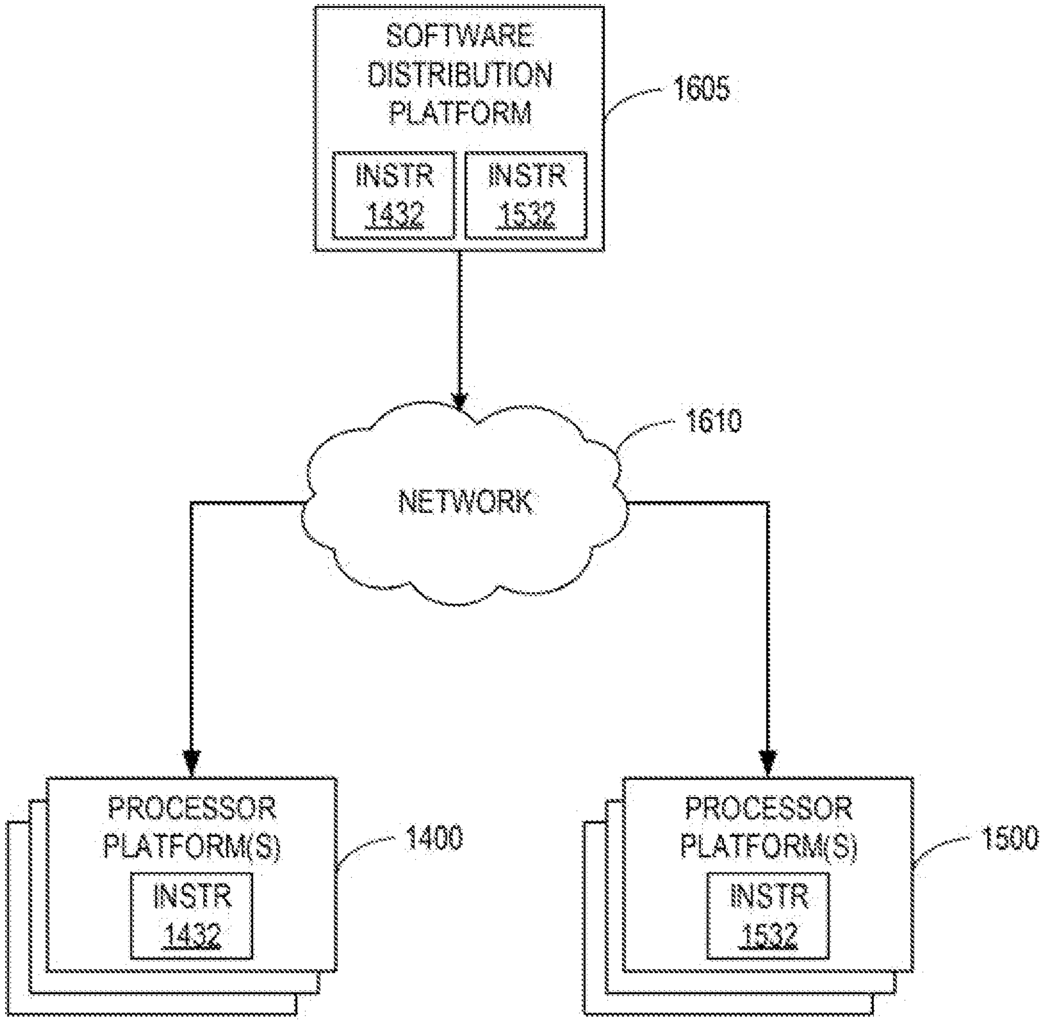
FIG. 16 is a block diagram of an example software distribution platform to distribute software to one(s) of the example client devices of FIGS. 1 and/or 2 and/or the example central server of FIGS. 1 and/or 3.

FIG. 16 is a block diagram of an example software distribution platform 1605 to distribute software (e.g., software corresponding to the example computer and/or machine readable instructions of FIGS. 10-13) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers). The example software distribution platform 1605 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example machine readable instructions 1432 of FIG. 14 and/or the example machine readable instructions 1532 of FIG. 15. The third parties may be consumers, users, retailers, OEMs, etc., who purchase and/or license the software for use and/or re-sale and/or sub-licensing. In the illustrated example, the software distribution platform 1605 includes one or more servers and one or more storage devices. The storage devices store the machine readable instructions 1432, 1532, which may correspond to the example machine readable instructions 1000, 1100, 1200, 1300 of FIGS. 10-13, as described above. The one or more servers of the example software distribution platform 1605 are in communication with a network 1610, which may correspond to any one or more of the Internet and/or any of the example networks 122, 1426, 1526 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the machine readable instructions 1432, 1532 from the software distribution platform 1605. For example, the software, which may correspond to the example machine readable instructions 1000, 1100, 1200, 1300 of FIGS. 10-13, may be downloaded to the example processor platform 1400 of FIG. 14, which is to execute the machine readable instructions 1432 to implement the example client device 200 of FIG. 2. In some examples, the software, which may correspond to the example machine readable instructions 1300 of FIG. 13, may be downloaded to the example processor platform 1500 of FIG. 15, which is to execute the machine readable instructions 1532 to implement the example central server 300 of FIG. 3. In some example, one or more servers of the software distribution platform 1605 periodically offer, transmit, and/or force updates to the software (e.g., the example machine readable instructions 1432 of FIG. 14 and/or the example machine readable instructions 1532 of FIG. 15) to ensure improvements, patches, updates, etc., are distributed and applied to the software at the end user devices.

From the foregoing, it will be appreciated that example systems, methods, apparatus, and articles of manufacture have been disclosed that facilitate the generation, execution, and maintaining of collaborative aircraft checklists. The disclosed systems, methods, apparatus and articles of manufacture present and update aircraft checklists to multiple aircraft personnel in substantially real time. The disclosed systems, methods, apparatus and articles of manufacture allows the multiple aircraft personnel to view a status of various checklist actions in a flight project and to update the status of the various checklist actions in substantially real time.

Advantageously, the disclosed systems, methods, apparatus and articles of manufacture connect various flight project roles (e.g., operators, ground crew, site leads, mission commanders, etc.) together through a set of collaborative client applications that implement distributed and dynamic electronic aircraft checklists. The disclosed systems, methods, apparatus and articles of manufacture may implement applications that may be executed by a plurality of different types of devices to facilitate the sharing of a common view of a flight project across flight project roles and hardware platforms. Advantageously, the disclosed systems, methods, apparatus and articles of manufacture scales tasks across geography and type of hardware platform to reduce operator and ground crew workload.

Advantageously, centralized and/or distributed servers may manage the generation, execution, and maintenance of the aircraft checklists, which may reduce the hardware, software, and/or firmware resources needed by client devices to execute client applications to implement the aircraft checklists. The disclosed systems, methods, apparatus, and articles of manufacture improve the efficiency of using a computing device by offloading computing tasks and database control to the centralized and/or distributed servers. The disclosed systems, methods, apparatus, and articles of manufacture are accordingly directed to one or more improvement(s) in the functioning of a computer.

Example methods, apparatus, systems, and articles of manufacture to implement collaborative aircraft checklists are disclosed herein. Further examples and combinations thereof include the following:

Example 1 includes an apparatus comprising at least one memory including instructions, and at least one processor to execute the instructions to at least launch actions of a checklist on a user interface of a first client device, the actions including a first action to be completed in sequence to execute a flight stage of a flight project, the flight project associated with flight of an aircraft, the flight project to be accessed by client devices via a network, the client devices including the first client device, a second client device, and a third client device, in response to an update of the first action by the first client device, generate a first message including the update, in response to a validation of the update by the second client device, distribute a second message including the update to the third client device to update the checklist on the third client device, and cause the aircraft to execute the flight stage based on the update.

Example 2 includes the apparatus of example 1, wherein the actions are first actions, the checklist is a first checklist, the flight stage is a pre-flight stage, and the at least one processor is to generate the flight project based on an identifier of the aircraft, identify flight stages based on the flight project, the flight stages including the pre-flight stage, an in-flight stage, and a post-flight stage, the in-flight stage including at least one of a take-off or landing of the aircraft, generate checklists based on the flight stages and the identifier, the checklists including the first checklist, a second checklist, and a third checklist, the first checklist including the first actions based on the pre-flight stage, the second checklist including second actions based on the in-flight stage, and the third checklist including third actions based on the post-flight stage, identify flight project roles based on the checklists, the flight project roles to execute at least one of the first actions, the second actions, or the third actions, and associate at least one of the flight project, the identifier, the flight stages, the checklists, or the flight project roles in one or more databases.

Example 3 includes the apparatus of example 1 or 2, wherein at least one of the first client device, the second client device, or the third client device is a portable device, the portable device including a handheld device or a wearable device, the wearable device including a head-mounted display.

Example 4 includes the apparatus of examples 1-3, wherein the checklist is a first checklist, the actions are first actions including a second action, the flight stage is a first flight stage, and the at least one processor is to identify the first flight stage and a second flight stage based on the flight project, launch the first checklist corresponding to the first flight stage, in response to an update of the second action, validate the second action based on a measurement from the aircraft, and in response to a determination that the first flight stage is complete after an update of the first actions, launch a second checklist corresponding to the second flight stage.

Example 5 includes the apparatus of examples 1-4, wherein the actions are second actions, the user interface is a first user interface, and the at least one processor is to detect a first flight project role based on a first type of the first client device, identify the second actions based on the first flight project role and the checklist, the first flight project role to cause an execution of the first action, the launch of the second actions based on the identification, detect a second flight project role based on a second type of the second client device, and identify third actions based on the second flight project role and the checklist, the third actions including a fourth action to be executed by the second flight project role.

Example 6 includes the apparatus of examples 1-5, wherein the at least one processor is to launch a second user interface including the third actions on the second client device, in response to an execution of the first action by the first flight project role, update the first action on the checklist by the first client device, and in response to the distribution of the second message, enable the fourth action on the checklist on the second client device, the enablement of the fourth action to cause the fourth action to be executed by the second flight project role.

Example 7 includes the apparatus of examples 1-6, wherein the update is a first update, and the at least one processor is to in response to a generation of the first message, transmit the first message to at least one server, the first message to cause the at least one server to store the first update in a first database at a first time, determine whether the first update is in conflict with a second update, the second client device to transmit a second message to the at least one server, the second message including the second update to the first action, the at least one server to store the second update in the first database at a second time after the first time, and in response to a determination that the first update is in conflict with the second update the checklist with the first update based on the first time, the checklist stored in a second database, and generate an alert indicative of a rejection of the second update.

Example 8 includes at least one non-transitory computer readable medium comprising instructions that, when executed, cause at least one processor to at least launch actions of a checklist on a user interface of a first client device, the actions including a first action to be completed in sequence to execute a flight stage of a flight project, the flight project associated with flight of an aircraft, the flight project to be accessed by client devices via a network, the client devices including the first client device, a second client device, and a third client device, in response to an update of the first action by the first client device, generate a first message including the update, in response to a validation of the update by the second client device, distribute a second message including the update to the third client device to update the checklist on the third client device, and cause the aircraft to execute the flight stage based on the update.

Example 9 includes the at least one non-transitory computer readable medium of example 8, wherein the actions are first actions, the checklist is a first checklist, the flight stage is a pre-flight stage, and the instructions, when executed, cause the at least one processor to generate the flight project based on an identifier of the aircraft, identify flight stages based on the flight project, the flight stages including the pre-flight stage, an in-flight stage, and a post-flight stage, the in-flight stage including at least one of a take-off or landing of the aircraft, generate checklists based on the flight stages and the identifier, the checklists including the first checklist, a second checklist, and a third checklist, the first checklist including the first actions based on the pre-flight stage, the second checklist including second actions based on the in-flight stage, and the third checklist including third actions based on the post-flight stage, identify flight project roles based on the checklists, the flight project roles to execute at least one of the first actions, the second actions, or the third actions, and associate at least one of the flight project, the identifier, the flight stages, the checklists, or the flight project roles in one or more databases.

Example 10 includes the at least one non-transitory computer readable medium of examples 8 or 9, wherein the at least one processor is included in a portable device, the portable device including a handheld device or a wearable device, the wearable device including a head-mounted display.

Example 11 includes the at least one non-transitory computer readable medium of examples 8-10, wherein the checklist is a first checklist, the actions are first actions including a second action, the flight stage is a first flight stage, and the instructions, when executed, cause the at least one processor to identify the first flight stage and a second flight stage based on the flight project, launch the first checklist corresponding to the first flight stage, in response to an update of the second action, validate the second action based on a measurement from the aircraft, and in response to a determination that the first flight stage is complete after an update of the first actions, launch a second checklist corresponding to the second flight stage.

Example 12 includes the at least one non-transitory computer readable medium of examples 8-11, wherein the actions are second actions, the user interface is a first user interface, and the instructions, when executed, cause the at least one processor to detect a first flight project role based on a first type of the first client device, identify the second actions based on the first flight project role and the checklist, the first flight project role to cause an execution of the first action, the launch of the second actions based on the identification, detect a second flight project role based on a second type of the second client device, and identify third actions based on the second flight project role and the checklist, the third actions including a fourth action to be executed by the second flight project role.

Example 13 includes the at least one non-transitory computer readable medium of examples 8-12, wherein the instructions, when executed, cause the at least one processor to launch a second user interface including the third actions on the second client device, in response to an execution of the first action by the first flight project role, update the first action on the checklist by the first client device, and in response to the distribution of the second message, enable the fourth action on the checklist on the second client device, the enablement of the fourth action to cause the fourth action to be executed by the second flight project role.

Example 14 includes the at least one non-transitory computer readable medium of examples 8-13, wherein the update is a first update, and the instructions, when executed, cause at least one processor to in response to a generation of the first message, transmit the first message to at least one server, the first message to cause the at least one server to store the first update in a first database at a first time, determine whether the first update is in conflict with a second update, the second client device to transmit a second message to the at least one server, the second message including the second update to the first action, the at least one server to store the second update in the first database at a second time after the first time, and in response to a determination that the first update is in conflict with the second update the checklist with the first update based on the first time, the checklist stored in a second database, and generate an alert indicative of a rejection of the second update.

Example 15 includes a method comprising launching actions of a checklist on a user interface of a first client device, the actions including a first action to be completed in sequence to execute a flight stage of a flight project, the flight project associated with flight of an aircraft, the flight project to be accessed by client devices via a network, the client devices including the first client device, a second client device, and a third client device, in response to an update of the first action by the first client device, generating a first message including the update, in response to the second client device validating the update, distributing a second message including the update to the third client device to update the checklist on the third client device, and causing the aircraft to execute the flight stage based on the update.

Example 16 includes the method of example 15, wherein the actions are first actions, the checklist is a first checklist, the flight stage is a pre-flight stage, and further including generating the flight project based on an identifier of the aircraft, identifying flight stages based on the flight project, the flight stages including the pre-flight stage, an in-flight stage, and a post-flight stage, the in-flight stage including at least one of a take-off or landing of the aircraft, generating checklists based on the flight stages and the identifier, the checklists including the first checklist, a second checklist, and a third checklist, the first checklist including the first actions based on the pre-flight stage, the second checklist including second actions based on the in-flight stage, and the third checklist including third actions based on the post-flight stage, identifying flight project roles based on the checklists, the flight project roles to execute at least one of the first actions, the second actions, or the third actions, and associating at least one of the flight project, the identifier, the flight stages, the checklists, or the flight project roles in one or more databases.

Example 17 includes the method of example 15 or 16, wherein the checklist is a first checklist, the actions are first actions including a second action, the flight stage is a first flight stage, and further including identifying the first flight stage and a second flight stage based on the flight project, launching the first checklist corresponding to the first flight stage, in response to updating the second action, validating the second action based on a measurement from the aircraft, and in response to determining that the first flight stage is complete after updating the first actions, launching a second checklist corresponding to the second flight stage.

Example 18 includes the method of examples 15-17, wherein the actions are second actions, the user interface is a first user interface, and further including detecting a first flight project role based on a first type of the first client device, identifying the second actions based on the first flight project role and the checklist, the first flight project role to execute the first action, the launching of the second actions based on the identifying, detecting a second flight project role based on a second type of the second client device, and identifying third actions based on the second flight project role and the checklist, the third actions including a fourth action to be executed by the second flight project role.

Example 19 includes the method of examples 15-18, further including launching a second user interface including the third actions on the second client device, in response to an execution of the first action by the first flight project role, updating the first action on the checklist by the first client device, and in response to the distributing of the second message, enabling the fourth action on the checklist on the second client device, the enabling of the fourth action to cause the fourth action to be executed by the second flight project role.

Example 20 includes the method of examples 15-19, wherein the update is a first update, and further including in response to generating the first message, transmitting the first message to at least one server, the at least one server to store the first update in a first database at a first time, in response to the second client device generating a second update to the first action, transmitting a second message to the at least one server, the at least one server to store the second update in the first database at a second time after the first time, and in response to determining a conflict based on the first update and the second update updating the checklist with the first update based on the first time, the checklist stored in a second database, and generating an alert indicative of a rejection of the second update.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
at least one memory;
machine-readable instructions; and
at least one processor circuit to execute the machine-readable instructions to at least:
launch actions of a checklist on a user interface of a first client device, the actions including a first action to be completed in sequence to execute a flight stage of a flight project, the flight project associated with flight of an aircraft, the flight project to be accessed by client devices via a network, the client devices including the first client device, a second client device, and a third client device;
in response to an update of the first action by the first client device, generate a first message including the update;
in response to a validation of the update by the second client device, distribute a second message including the update to the third client device to update the checklist on the third client device; and
cause the aircraft to execute the flight stage based on the update.

2. The apparatus of claim 1, wherein the actions are first actions, the checklist is a first checklist, the flight stage is a pre-flight stage, and one or more of the at least one processor circuit is to:
generate the flight project based on an identifier of the aircraft;
identify flight stages based on the flight project, the flight stages including the pre-flight stage, an in-flight stage, and a post-flight stage, the in-flight stage including at least one of a take-off or landing of the aircraft;
generate checklists based on the flight stages and the identifier, the checklists including the first checklist, a second checklist, and a third checklist, the first checklist including the first actions based on the pre-flight stage, the second checklist including second actions based on the in-flight stage, and the third checklist including third actions based on the post-flight stage;
identify flight project roles based on the checklists, the flight project roles to execute at least one of the first actions, the second actions, or the third actions; and
associate at least one of the flight project, the identifier, the flight stages, the checklists, or the flight project roles in one or more databases.

3. The apparatus of claim 2, wherein at least one of the first client device, the second client device, or the third client device is a portable device, the portable device including a handheld device or a wearable device, the wearable device including a head-mounted display.

4. The apparatus of claim 1, wherein the checklist is a first checklist, the actions are first actions including a second action, the flight stage is a first flight stage, and one or more of the at least one processor circuit is to:
identify the first flight stage and a second flight stage based on the flight project;
launch the first checklist corresponding to the first flight stage;
in response to an update of the second action, validate the second action based on a measurement from the aircraft; and
in response to a determination that the first flight stage is complete after an update of the first actions, launch a second checklist corresponding to the second flight stage.

5. The apparatus of claim 1, wherein the actions are second actions, the user interface is a first user interface, and one or more of the at least one processor circuit is to:
detect a first flight project role based on a first type of the first client device;
identify the second actions based on the first flight project role and the checklist, the first flight project role to cause an execution of the first action, the launch of the second actions based on the identification;
detect a second flight project role based on a second type of the second client device; and
identify third actions based on the second flight project role and the checklist, the third actions including a fourth action to be executed by the second flight project role.

6. The apparatus of claim 5, wherein one or more of the at least one processor circuit is to:
launch a second user interface including the third actions on the second client device;
in response to an execution of the first action by the first flight project role, update the first action on the checklist by the first client device; and
in response to the distribution of the second message, enable the fourth action on the checklist on the second client device, the enablement of the fourth action to cause the fourth action to be executed by the second flight project role.

7. The apparatus of claim 1, wherein the update is a first update, and one or more of the at least one processor circuit is to:
in response to a generation of the first message, transmit the first message to at least one server, the first message to cause the at least one server to:
store the first update in a first database at a first time;
determine whether the first update is in conflict with a second update, the second client device to transmit a third message to the at least one server, the third message including the second update to the first action, the at least one server to store the second update in the first database at a second time after the first time; and
in response to a determination that the first update is in conflict with the second update:
update the checklist with the first update based on the first time, the checklist stored in a second database; and
generate an alert indicative of a rejection of the second update.

8. At least one non-transitory computer readable medium comprising machine-readable instructions that cause at least one processor circuit to at least:
launch actions of a checklist on a user interface of a first client device, the actions including a first action to be completed in sequence to execute a flight stage of a flight project, the flight project associated with flight of an aircraft, the flight project to be accessed by client devices via a network, the client devices including the first client device, a second client device, and a third client device;
in response to an update of the first action by the first client device, generate a first message including the update;

in response to a validation of the update by the second client device, distribute a second message including the update to the third client device to update the checklist on the third client device; and cause the aircraft to execute the flight stage based on the update.

9. The at least one non-transitory computer readable medium of claim 8, wherein the actions are first actions, the checklist is a first checklist, the flight stage is a pre-flight stage, and the machine-readable instructions are to cause one or more of the at least one processor circuit to:

generate the flight project based on an identifier of the aircraft;

identify flight stages based on the flight project, the flight stages including the pre-flight stage, an in-flight stage, and a post-flight stage, the in-flight stage including at least one of a take-off or landing of the aircraft;

generate checklists based on the flight stages and the identifier, the checklists including the first checklist, a second checklist, and a third checklist, the first checklist including the first actions based on the pre-flight stage, the second checklist including second actions based on the in-flight stage, and the third checklist including third actions based on the post-flight stage;

identify flight project roles based on the checklists, the flight project roles to execute at least one of the first actions, the second actions, or the third actions; and associate at least one of the flight project, the identifier, the flight stages, the checklists, or the flight project roles in one or more databases.

10. The at least one non-transitory computer readable medium of claim 9, wherein one or more of the at least one processor circuit is included in a portable device, the portable device including a handheld device or a wearable device, the wearable device including a head-mounted display.

11. The at least one non-transitory computer readable medium of claim 8, wherein the checklist is a first checklist, the actions are first actions including a second action, the flight stage is a first flight stage, and the machine-readable instructions are to cause one or more of the at least one processor circuit to:

identify the first flight stage and a second flight stage based on the flight project;

launch the first checklist corresponding to the first flight stage;

in response to an update of the second action, validate the second action based on a measurement from the aircraft; and in response to a determination that the first flight stage is complete after an update of the first actions, launch a second checklist corresponding to the second flight stage.

12. The at least one non-transitory computer readable medium of claim 8, wherein the actions are second actions, the user interface is a first user interface, and the machine-readable instructions are to cause one or more of the at least one processor circuit to:

detect a first flight project role based on a first type of the first client device;

identify the second actions based on the first flight project role and the checklist, the first flight project role to cause an execution of the first action, the launch of the second actions based on the identification;

detect a second flight project role based on a second type of the second client device; and identify third actions based on the second flight project role and the checklist, the third actions including a fourth action to be executed by the second flight project role.

13. The at least one non-transitory computer readable medium of claim 12, wherein the machine-readable instructions are to cause one or more of the at least one processor circuit to:

launch a second user interface including the third actions on the second client device;

in response to an execution of the first action by the first flight project role, update the first action on the checklist by the first client device; and in response to the distribution of the second message, enable the fourth action on the checklist on the second client device, the enablement of the fourth action to cause the fourth action to be executed by the second flight project role.

14. The at least one non-transitory computer readable medium of claim 8, wherein the update is a first update, and the machine-readable instructions are to cause one or more of the at least one processor circuit to:

in response to a generation of the first message, transmit the first message to at least one server, the first message to cause the at least one server to:

store the first update in a first database at a first time;

determine whether the first update is in conflict with a second update, the second client device to transmit a third message to the at least one server, the third message including the second update to the first action, the at least one server to store the second update in the first database at a second time after the first time; and in response to a determination that the first update is in conflict with the second update:

update the checklist with the first update based on the first time, the checklist stored in a second database; and generate an alert indicative of a rejection of the second update.

15. A method comprising:

launching actions of a checklist on a user interface of a first client device, the actions including a first action to be completed in sequence to execute a flight stage of a flight project, the flight project associated with flight of an aircraft, the flight project to be accessed by client devices via a network, the client devices including the first client device, a second client device, and a third client device;

in response to an update of the first action by the first client device, generating a first message including the update;

in response to the second client device validating the update, distributing a second message including the update to the third client device to update the checklist on the third client device; and causing the aircraft to execute the flight stage based on the update.

16. The method of claim 15, wherein the actions are first actions, the checklist is a first checklist, the flight stage is a pre-flight stage, and further including:

generating the flight project based on an identifier of the aircraft;

identifying flight stages based on the flight project, the flight stages including the pre-flight stage, an in-flight stage, and a post-flight stage, the in-flight stage including at least one of a take-off or landing of the aircraft;

generating checklists based on the flight stages and the identifier, the checklists including the first checklist, a second checklist, and a third checklist, the first checklist including the first actions based on the pre-flight stage, the second checklist including second actions based on the in-flight stage, and the third checklist including third actions based on the post-flight stage;

identifying flight project roles based on the checklists, the flight project roles to execute at least one of the first actions, the second actions, or the third actions; and associating at least one of the flight project, the identifier, the flight stages, the checklists, or the flight project roles in one or more databases.

17. The method of claim 15, wherein the checklist is a first checklist, the actions are first actions including a second action, the flight stage is a first flight stage, and further including:

identifying the first flight stage and a second flight stage based on the flight project;

launching the first checklist corresponding to the first flight stage;

in response to updating the second action, validating the second action based on a measurement from the aircraft; and in response to determining that the first flight stage is complete after updating the first actions, launching a second checklist corresponding to the second flight stage.

18. The method of claim 15, wherein the actions are second actions, the user interface is a first user interface, and further including:

detecting a first flight project role based on a first type of the first client device;

identifying the second actions based on the first flight project role and the checklist, the first flight project role to execute the first action, the launching of the second actions based on the identifying;

detecting a second flight project role based on a second type of the second client device; and identifying third actions based on the second flight project role and the checklist, the third actions including a fourth action to be executed by the second flight project role.

19. The method of claim 18, further including:

launching a second user interface including the third actions on the second client device;

in response to an execution of the first action by the first flight project role, updating the first action on the checklist by the first client device; and in response to the distributing of the second message, enabling the fourth action on the checklist on the second client device, the enabling of the fourth action to cause the fourth action to be executed by the second flight project role.

20. The method of claim 15, wherein the update is a first update, and further including:

in response to generating the first message, transmitting the first message to at least one server, the at least one server to store the first update in a first database at a first time;

in response to the second client device generating a second update to the first action, transmitting a third message to the at least one server, the at least one server to store the second update in the first database at a second time after the first time; and in response to determining a conflict based on the first update and the second update:

updating the checklist with the first update based on the first time, the checklist stored in a second database; and generating an alert indicative of a rejection of the second update.

* * * * *